US012792573B1

(12) United States Patent
Mogill

(10) Patent No.: US 12,792,573 B1
(45) Date of Patent: Nov. 10, 2026

(54) SYSTEMS FOR AND METHODS OF MULTI-SOURCE DATA CALIBRATION AND PREDICTIVE MODEL RENDERING

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/414,215

(22) Filed: Dec. 9, 2025

(51) Int. Cl.
*G06F 16/21* (2019.01)
*G06F 16/26* (2019.01)
*G06F 21/55* (2013.01)
*G06F 21/62* (2013.01)

(52) U.S. Cl.
CPC ............ *G06F 16/211* (2019.01); *G06F 16/26* (2019.01); *G06F 21/554* (2013.01); *G06F 21/6218* (2013.01); *G06F 2221/034* (2013.01)

(58) Field of Classification Search
None
See application file for complete search history.

(56) References Cited

U.S. PATENT DOCUMENTS 6,995,768 B2 * 2/2006 Jou ......................... G06F 9/542 345/440
9,032,076 B2 * 5/2015 Buehler ................ H04L 63/105 726/4
10,599,957 B2 * 3/2020 Walters ................... G06F 9/541
2023/0031414 A1 2/2023 Kanneh

FOREIGN PATENT DOCUMENTS

IN 202431052379 A 7/2024
IN 202411093116 A 1/2025
IN 202521069329 A 7/2025

* cited by examiner

*Primary Examiner* — Farid Homayounmehr
*Assistant Examiner* — Suman Debnath
(74) *Attorney, Agent, or Firm* — CALDWELL LLC

(57) ABSTRACT

A system for multi-source data calibration and predictive model rendering. The system includes at least a processor configured to receive a plurality of heterogeneous data objects, wherein each of the plurality of heterogenous data objects is associated with an entity and map the plurality of heterogenous data objects to a canonical data schema. The processor is further configured to generate canonical feature data as a function of the canonical data schema by identifying a derivation context for each of the plurality of heterogeneous data objects and normalizing a value magnitude across each of the plurality of data objects as a function of the derivation context. The processor is still further configured to generate, using a predictive modeling engine, a projection value object as a function of the canonical feature data, and render, at a visualization interface, an output object including the canonical feature data and the projection value object.

20 Claims, 7 Drawing Sheets

SYSTEMS FOR AND METHODS OF MULTI-SOURCE DATA CALIBRATION AND PREDICTIVE MODEL RENDERING

FIELD OF THE INVENTION

The present invention generally relates to the field of data processing and machine-learning systems. In particular, the present invention is directed to systems for and methods of multi-source data calibration and predictive model rendering.

BACKGROUND

Data originating from distinct processing pipelines often share conceptual similarity but differ in structural format, feature definition, and value scale. Even when multiple pipelines generate data representing related measurements, variations in source instrumentation, preprocessing logic, or sampling frequency cause semantically equivalent fields to diverge numerically. These inconsistencies complicate downstream aggregation, model training, and comparative analytics, since values contributing to a common analytical output may not be directly compatible. Conventional data integration systems typically lack mechanisms for harmonizing such partially correlated datasets in real time, leading to loss of fidelity and propagation of scaling errors across dependent models.

SUMMARY OF THE DISCLOSURE

In some aspects, the techniques described herein relate to a system for multi-source data calibration and predictive model rendering, the system including: at least a processor and a memory communicatively connected to the at least a processor, wherein the memory contains instructions configuring the at least a processor to: receive a plurality of heterogeneous data objects, wherein each of the plurality of heterogenous data objects is associated with an entity, map the plurality of heterogenous data objects to a canonical data schema, generate canonical feature data as a function of the canonical data schema, wherein generating the canonical feature data includes: identifying a derivation context for each of the plurality of heterogeneous data objects and normalizing a value magnitude across each of the plurality of data objects as a function of the derivation context, generate, using a predictive modeling engine, a projection value object as a function of the canonical feature data, and render, at a visualization interface, an output object including the canonical feature data and the projection value object.

In some aspects, the techniques described herein relate to a method of multi-source data calibration and predictive model rendering, the method including: receiving, by at least a processor, a plurality of heterogeneous data objects, wherein each of the plurality of heterogenous data objects is associated with an entity, mapping, using the at least a processor, the plurality of heterogenous data objects to a canonical data schema, generating, using the at least a processor, canonical feature data as a function of the canonical data schema, wherein generating the canonical feature data includes: identifying a derivation context for each of the plurality of heterogeneous data objects and normalizing a value magnitude across each of the plurality of data objects as a function of the derivation context, generating, using a predictive modeling engine, a projection value object as a function of the canonical feature data, and rendering, at a visualization interface, an output object including the canonical feature data and the projection value object.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
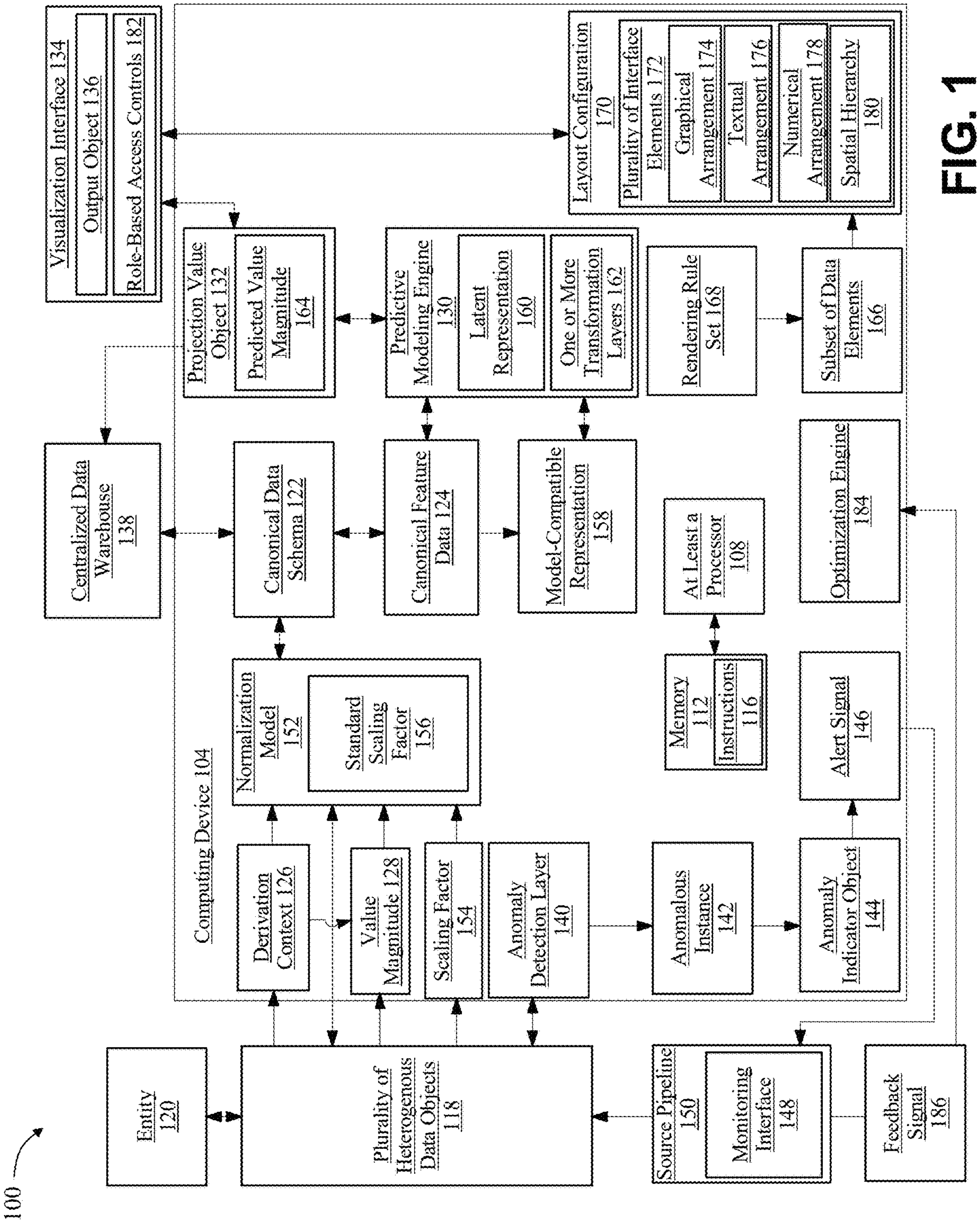
FIG. 1 is a block diagram of an exemplary system for multi-source data calibration and predictive model rendering.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

This innovation relates to a controlled client-admission framework that selectively authorizes participation of law firms satisfying predefined cultural and operational alignment criteria. By constraining eligibility to firms demonstrating verified commitment and compatibility, the system may curate a high-integrity client network that reinforces the reliability and reputation of the broader referral environment. Client admission records may be stored within a permissioned ledger architecture, providing immutable documentation of acceptance actions and associated metadata. In some embodiments, the framework may incorporate anomaly detection models configured to identify discrepancies or intentional data manipulation within applicant submissions, thereby preserving the authenticity and stability of the client ecosystem.

At a high level, aspects of the present disclosure are directed to systems and methods for multi-source data calibration and predictive model rendering. In an embodiment, a computing system receives heterogeneous data objects generated by distinct data pipelines, maps those data objects to a canonical data schema, and applies model-based normalization to reconcile variations in value magnitude arising from differences in derivation context. The system then generates predictive outputs and renders a unified visualization interface configured for adaptive feedback and model optimization.

Aspects of the present disclosure can be used to standardize partially correlated datasets that originate from disparate processing environments. Aspects of the present disclosure can also be used to enable consistent feature scaling and inference across data objects that differ in structure, sampling rate, or preprocessing logic. This is so, at least in part, because the disclosed system incorporates a normalization model and canonical schema that collectively transform non-identical inputs into a unified analytical representation suitable for downstream prediction and visualization.

Aspects of the present disclosure allow for real-time aggregation, calibration, and visualization of data originating from multiple heterogeneous pipelines while maintaining compatibility across predictive and anomaly-detection models. Exemplary embodiments illustrating aspects of the present disclosure are described below in the context of several specific examples.

Conventional client admission processes often depend on manual evaluation and static data review, leading to inconsistent recordkeeping, delayed verification, and vulnerability to data manipulation or falsified representations. The disclosed system addresses these challenges through a computer-implemented framework that authenticates, records, and monitors admission decisions in real time. By leveraging a permissioned ledger architecture, the system enables cryptographically verifiable tracking of client admission events, ensuring that each acceptance or rejection is recorded as an immutable transaction accessible only to authorized participants. Integrated anomaly detection models analyze application data for statistical irregularities or suspicious input patterns, filtering potential misrepresentations before they propagate through the network. Through these mechanisms, the system enhances data integrity, processing accuracy, and operational efficiency in the management of client onboarding workflows, while maintaining a trusted, auditable environment for subsequent analytical and predictive operations.

Referring now to FIG. 1, an exemplary embodiment of system 100 for multi-source data calibration and predictive model rendering is illustrated. System 100 may include circuitry such as without limitation at least a processor 108 communicatively connected to a memory 112 containing instructions 116 configuring at least a processor 108 to initiate one or more tasks as described throughout this disclosure; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In further reference to FIG. 1, in an embodiment, at least a processor 108 may be configured to receive a plurality of heterogeneous data objects, wherein each of the plurality of heterogenous data objects 118 is associated with an entity 120. For purposes of this disclosure, a "heterogeneous data object" is a digital record, message, or structured artifact that encodes one or more values, attributes, or metrics generated by a data-producing pipeline. In an embodiment, each data object may differ from others in structural format, data type, and/or contextual meaning. For example, a marketing analytics pipeline may output a data object representing marketing results (e.g., click-through rates, cost-per-lead statistics, or campaign identifiers), while another pipeline may produce conversion metrics (e.g., client onboarding percentages or deal-closure counts). Additional pipelines may generate leadership maturity scores and/or cultural survey data, which may use dissimilar scales or categorical encodings to express related organizational measurements. These records are heterogeneous because they originate from distinct subsystems and encode semantically related but structurally divergent data. For purposes of this disclosure, the term "heterogeneous" refers to non-uniformity across one or more data dimensions. Such as schema structure, field naming conventions, unit of measure, sampling interval, and/or statistical range. Thus, two pipelines might report an engagement metric, one as a decimal between 0 and 1 and another as a percentage value between 0 and 100, rendering the underlying data heterogeneous in magnitude and type. For purposes of this disclosure, a "data object" is a digital container containing one or more instances. In an embodiment, data objects may be formatted in various formats such as a JSON record, XML document, database row, CSV entry, and/or API payload. Each data object may include multiple fields representing measured values or derived features and may include metadata describing its source, timestamp, or measurement conditions. For purposes of this disclosure, an "entity" is the identifiable subject or unit to which one or more data objects correspond. In various embodiments, an entity 120 may represent a client organization, a campaign identifier, a leadership cohort, or another discrete unit of analysis tracked across data pipelines.

In continued reference to FIG. 1, in an embodiment, the plurality of heterogeneous data objects may be ingested through a data-ingestion interface communicatively coupled to at least a processor 108. For purposes of this disclosure, a "data-ingestion interface" is a hardware- and/or software-based subsystem configured to receive, parse, and register incoming data objects from one or more external pipelines or data sources. In various embodiments, the data-ingestion interface may include one or more network endpoints, message queues, application programming interfaces (APIs), data stream listeners, and/or file transfer modules that enable structured data exchange between external systems and at least a processor 108. In an embodiment, the interface may collect and queue data objects received from independent pipelines, such as marketing analytics, conversion tracking, leadership assessment, and cultural feedback systems, and temporarily store them in a staging buffer. Upon receipt, at least a processor 108 may associate each data object with its corresponding entity 120 and derivation context 126 for subsequent schema mapping. In an embodiment, the data-ingestion interface may perform preprocessing operations such as authentication, data-type validation, timestamp assignment, and metadata tagging before forwarding received data objects to a transient storage buffer or directly to a mapping module. For example, the interface may expose RESTful or gRPC-based endpoints that receive JSON or CSV payloads corresponding to marketing results, conversion rates, leadership maturity scores, and cultural survey data. In some embodiments, the interface may support batch-mode ingestion for periodically exported datasets, or stream-mode ingestion for continuously generated telemetry data. In an embodiment, the data-ingestion interface may provide a unified entry layer that decouples heterogeneous upstream data pipelines from the internal canonical schema. This modular configuration may allow system 100 to flexibly accommodate differing transmission protocols, data frequencies, and payload structures without requiring modifications to downstream components. The interface therefore may ensure that heterogeneous data objects, regardless of origin or format, enter the calibration pipeline in a consistent, validated, and traceable manner. In this manner, the receiving operation may function as the entry point of the multi-source data calibration pipeline, ensuring that all downstream modules operate on an integrated but traceable set of raw, context-aware inputs.

Still referring to FIG. 1, in some embodiments, at least one of the heterogeneous data objects may include free-form text or other unstructured input received through the data-ingestion interface. For purposes of this disclosure, "free-form text" refers to alphanumeric sequences or narrative responses not bound by a predefined schema. For example, such as open-ended survey responses, client feedback narratives, and/or descriptive leadership assessments. In an embodiment system 100 may apply a language processing module prior to schema mapping. In an embodiment, the language processing module may perform one or more operations including tokenization, stop-word removal, named-entity recognition, or semantic embedding generation to convert unstructured text into a vectorized or feature-encoded representation. The resulting representation may then be packaged as a structured data object, associated with the corresponding entity 120, and transmitted to the canonical mapping stage. In this way, system 100 may accommodate both structured numerical records and unstructured textual inputs within a unified data-ingestion and calibration pipeline.

With further reference to FIG. 1, in an embodiment, language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Alternatively, or additionally, and with continued reference to FIG. 1, language processing module may be produced using one or more large language models (LLMs). A "large language model," as used herein, is a deep learning data structure that can recognize, summarize, translate, predict and/or generate text and other content based on knowledge gained from massive datasets. Large language models may be trained on corpora comprising structured, semi-structured, and unstructured textual data. Training sets may be drawn from diverse textual domains such as, without limitation, client communications, marketing materials, leadership assessments, cultural survey responses, campaign descriptions, and performance narratives. In some embodiments, training data may include examples of entity-specific documentation, such as anonymized client reports, leadership evaluation summaries, or historical performance notes, optionally combined with publicly available corpora to enhance semantic coverage and generalization. Training sets of an LLM may include information from one or more public or private databases, including those containing text associated with entities tracked by the system. In certain implementations, an LLM may also be trained on portions of stored records aligned with corresponding canonical features or predictive outcomes, thereby improving the model's ability to encode relevant linguistic constructs as quantitative embeddings. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if the input text fragment is "The team demonstrated strong communication and," the model may assign highest probability to continuations such as "collaboration," "leadership," or "alignment," depending on learned contextual associations from prior training data. The LLM may output such predictions by ranking tokens or phrases according to likelihood scores or prompt parameters, thereby generating coherent, contextually relevant continuations of partially observed text. In another example, when processing cultural survey responses such as "Our firm values continuous," the model may predict completions like "improvement" or "learning" based on linguistic probability. An LLM may include an encoder component for representing input text as dense semantic embeddings and a decoder component for generating or reconstructing predicted text sequences from those embeddings. Within the present system, these encoder and decoder components may enable transformation of unstructured text inputs, such as leadership feedback, marketing narratives, or survey comments, into structured, model-compatible representations 158 suitable for canonical schema mapping and subsequent feature calibration.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input to other words. As a non-limiting example, when processing a leadership assessment statement such as "The team demonstrated strong communication and accountability," the self-attention mechanism may learn to associate the token "communication" with "team" and "accountability," recognizing that these terms often co-occur in semantically related contexts describing leadership performance. In another example, when evaluating a cultural survey response such as "Our firm values openness and collaboration," the model may assign higher attention weights between "openness" and "collaboration," learning that these tokens frequently contribute to the same conceptual feature space associated with organizational culture. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with a leadership assessment narrative, a cultural survey response, a marketing campaign description, a client feedback entry, or other free-form textual content submitted through a user interface of a client analytics system.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in an embodiment, at least a processor 108 may be configured to map the plurality of heterogenous data objects 118 to a canonical data schema 122. For purposes of this disclosure, a "canonical data schema" is a standardized data structure or schema definition that specifies the fields, data types, relationships, and scaling conventions used to represent heterogeneous data in a uniform analytical format. In an embodiment, the canonical data schema 122 may serve as a reference model through which data objects originating from distinct pipelines, such as marketing analytics systems, conversion tracking databases, leadership assessment platforms, or cultural survey engines, can be reconciled into a consistent representation suitable for cross-domain processing and analysis. In some embodiments, the canonical data schema 122 may include field identifiers that correspond to abstract analytical features, such as engagement metric, conversion efficiency, leadership maturity index, and/or organizational alignment score. Each field within the schema may define a permissible value range, statistical distribution, or unit of measurement, thereby allowing data derived from different upstream sources to be aligned under a common scale. For example, a marketing pipeline may output a "click-through rate" as a floating-point percentage, while a leadership assessment pipeline may produce a "participation index" on a 0-1 normalized scale; both values may be mapped to a single canonical field, such as engagement metric, with appropriate scaling and metadata annotation indicating their derivation contexts 126.

In further reference to FIG. 1, in an embodiment, at least a processor 108 may execute a schema-mapping engine that performs rule-based and model-based operations to align incoming heterogeneous data objects with schema-defined canonical fields. During execution, at least a processor 108 may parse each heterogeneous data object using a parsing engine to extract key-value pairs, nested features, and/or metadata tags. In an embodiment, extracted content may include, without limitation, marketing results such as click-through rates or campaign identifiers, conversion metrics such as client acquisition percentages, leadership maturity scores, and cultural survey data such as engagement or sentiment indicators. At least a processor 108 may then retrieve from memory a schema definition table that enumerates canonical feature identifiers including, but not limited to, engagement metric, conversion efficiency, leadership maturity index, and organizational alignment score. In an embodiment, each canonical feature entry may be associated with transformation rules, data-type expectations, and acceptable input aliases that describe how heterogeneous data fields are to be reconciled with canonical definitions. In an embodiment, at least a processor 108 may compare extracted field identifiers or metadata keys to canonical schema entries using deterministic lookup tables, hash-based aliasing, and/or embedding-based similarity metrics. In some embodiments, a trained schema-alignment model may calculate a confidence score for each potential match, thereby enabling probabilistic mapping when deterministic matching rules are insufficient. Upon establishing a mapping relationship, at least a processor 108 may cast data to the schema-defined type, such as converting integers to floating-point values or categorical encodings to enumerated indices and perform preliminary scaling or normalization according to stored unit-conversion constants or schema-specific parameters. Once each data object has been mapped, at least a processor 108 may verify that all required canonical fields are populated and that data types conform to schema constraints.

In continued reference to FIG. 1, in an embodiment, unmapped or partially populated fields may be flagged and recorded in a schema validation log, and at least a processor 108 may generate metadata objects specifying mapping confidence, timestamp, and schema-version identifiers. These validation records may be written to a schema validation ledger stored in non-volatile memory. In some embodiments, at least a processor 108 may maintain a schema-version control module that assigns version identifiers to each active canonical schema and manages backward compatibility for previously mapped data. In an embodiment, version tracking may ensure that subsequent calibration and modeling operations can reproduce consistent results even when the canonical schema evolves over time. By executing these mapping and validation operations, at least a processor 108 may transform unstructured or pipeline-specific inputs into a structurally consistent, version-controlled dataset that serves as the foundation for all downstream processing. The mapped and validated outputs may subsequently be provided to one or more feature-generation modules configured to compute canonical feature data 124 as a function of the canonical data schema 122, as described in further detail below.

Still referring to FIG. 1, in an embodiment, at least a processor 108 may be configured to generate canonical feature data 124 as a function of the canonical data schema 122. For purposes of this disclosure, "canonical feature data" is a structured set of numerical or categorical feature values generated from data objects that have been mapped to the canonical data schema 122. In an embodiment, each canonical feature may represent a quantifiable attribute or relationship defined by schema-level rules and transformation functions. In some embodiments, canonical feature data 124 may include scalar values, normalized vectors, tensors, and/or graph-based feature embeddings derived from one or more canonical fields. For example, canonical feature data 124 may include numerical representations of engagement metrics, conversion efficiencies, leadership maturity indices, and/or cultural alignment scores, each expressed in standardized units and stored as elements within a feature vector corresponding to an entity 120.

With continued reference to FIG. 1, in an embodiment, at least a processor 108 may execute a feature-generation module that retrieves mapped data from the canonical data schema 122 and performs one or more mathematical or logical operations to compute derived features. These operations may include, without limitation, feature aggregation, ratio computation, temporal smoothing, dimensional reduction, and/or embedding projection. In an embodiment, at least a processor 108 may apply schema-defined transformation functions to convert raw values into canonical feature values according to the feature's statistical definition and scaling constants. In some embodiments, a machine-learning model such as a feedforward network, autoencoder, or regression layer may compute nonlinear transformations that produce higher-order or latent features capturing correlations among multiple canonical fields. In an embodiment, the resulting canonical feature data 124 may then be formatted into feature vectors indexed by entity identifier and timestamp, stored in memory, and provided as input to downstream modeling and calibration modules. In an embodiment, by generating canonical feature data 124 as a function of the canonical data schema 122, at least a processor 108 may effectively translate structurally harmonized data into a numerical representation that can be directly processed by predictive, normalization, and anomaly-detection engines. This may ensure that all downstream learning algorithms operate on features that are statistically compatible, semantically aligned, and contextually traceable to their source data objects.

With further reference to FIG. 1, in an embodiment, generating the canonical feature data 124 may include identifying a derivation context 126 for each of the plurality of heterogeneous data objects. For purposes of this disclosure, a "derivation context" refers to metadata or environmental descriptors that characterize how a given data object was generated, measured, or computed within its originating pipeline. In an embodiment, derivation context 126 may include attributes such as data source identifier, measurement conditions, preprocessing logic, sampling frequency, and/or normalization history. For example, a marketing data object may include context indicating that its value was derived from a weekly campaign performance model using rolling averages, while a leadership assessment data object may include context specifying that its score originated from a quarterly evaluation survey using a five-point ordinal scale. In an embodiment, at least a processor 108 may determine derivation context 126 by inspecting metadata embedded within each data object, querying a pipeline registry, and/or inferring context through pattern recognition models trained to classify source type based on data signature. Once identified, the derivation context 126 may be encoded as a context vector or metadata structure stored alongside each canonical feature. During subsequent processing, at least a processor 108 may reference this context to calibrate scaling factors 154, adjust feature weighting, or select transformation parameters that account for systematic differences across data sources. In some embodiments, a context-classification model may assign probabilistic context labels when explicit metadata is unavailable, enabling system 100 to handle partially annotated or inferred data origins. Accordingly, identifying derivation context 126 may allow system 100 to preserve lineage and interpretability across heterogeneous pipelines. In an embodiment, each canonical feature can be traced back to the conditions under which its contributing data were produced, ensuring that downstream normalization and modeling routines operate with awareness of source variability. This may enable consistent and explainable feature calibration across diverse input modalities.

In continued reference to FIG. 1, in an embodiment, generating the canonical feature data 124 may include normalizing a value magnitude 128 across each of the plurality of data objects as a function of the derivation context 126. For purposes of this disclosure, a "value magnitude" is a numerical amplitude or quantitative expression associated with a data object's feature prior to any calibration or scaling. In an embodiment, a value magnitude 128 may take the form of integer counts, floating-point ratios, probabilistic confidence values, and/or categorical encodings converted to numeric indices. Because each heterogeneous data object may originate from a different source pipeline 150, the value magnitude 128 of a given feature type may vary not only in unit or range but also in its underlying statistical distribution. For example, a marketing pipeline may yield a click-through rate reported as a percentage, a conversion pipeline may express client acquisition frequency as a normalized probability, and a leadership maturity pipeline may produce ordinal scores based on self-assessment scales. In an embodiment, to achieve a consistent analytical basis across such differing magnitudes, at least a processor 108 may execute a normalization routine that rescales or adjusts each value magnitude 128 in proportion to its corresponding derivation context 126. The derivation context 126 may specify, for example, whether a value was computed from an averaged dataset, a single transactional event, or an inferred model output, and at least a processor 108 may use this contextual metadata to determine the appropriate rescaling function or adjustment coefficient. In an embodiment, by normalizing value magnitudes 128 with explicit consideration of their contextual origin, system 100 may produce canonical feature representations that retain comparability across disparate data sources while preserving the statistical meaning of each measurement.

In further reference to FIG. 1, in an embodiment, normalizing the value magnitude 128 across each of the plurality of data objects may include applying a normalization model 152 to the plurality of heterogenous data objects 118. For purposes of this disclosure, a "normalization model" is a computational model or algorithmic framework executed by at least a processor and configured to transform raw or partially calibrated value magnitudes 128 into standardized, scale-consistent outputs. In an embodiment, the normalization model 152 may include one or more parameterized functions, regression frameworks, and/or neural network architectures trained to estimate transformation parameters, such as scaling coefficients, offsets, or bias terms, that align heterogeneous input distributions to a canonical reference distribution defined by the canonical data schema 122. In an embodiment, at least a processor 108 may load the normalization model 152 from memory and supply, as input, data including (i) raw and/or preprocessed value magnitudes 128 and (ii) derivation context metadata associated with each data object. The normalization model 152 may then apply a context-conditioned transformation that adjusts the magnitude of each feature according to its statistical relationship with the canonical reference. For example, the normalization model 152 may learn that marketing conversion metrics exhibit log-normal variance and apply a logarithmic rescaling function, while leadership maturity scores exhibit bounded ordinal behavior and require linear interpolation within a constrained range. In an embodiment, at least a processor 108 may execute the normalization model 152 as a batch operation across multiple data objects or as a streaming process that dynamically normalizes incoming values in real time.

In continued reference to FIG. 1, in an embodiment, the normalization model 152 may include a multi-stage architecture including a feature-standardization layer, a context-weighting layer, and/or an adaptive calibration layer. In an embodiment, the feature-standardization layer may apply baseline transformations (e.g., z-score or min-max scaling), the context-weighting layer may modify these transformations based on contextual embeddings derived from metadata, and the adaptive calibration layer may fine-tune scaling parameters using feedback from model performance metrics. In an embodiment, the normalization model 152 may be periodically retrained or fine-tuned using historical normalization results stored in the system's centralized data warehouse 138, thereby allowing it to adapt to evolving data distributions or source-specific drift. By applying the normalization model 152, at least a processor 108 may replace static scaling heuristics with a learned, context-aware calibration process that can generalize across data pipelines and time periods. In an embodiment, this model-based normalization may ensure that the canonical feature data 124 produced by system 100 reflects consistent statistical relationships even when underlying data generation processes change, thereby improving robustness and comparability across successive processing cycles.

With further reference to FIG. 1, in an embodiment, normalizing the value magnitude 128 across each of the plurality of data objects may include determining, using the normalization model 152, a scaling factor 154 for each of the plurality of heterogeneous data objects as a function of transformation parameters associated with the derivation context 126 of each of the plurality of heterogeneous data objects. For purposes of this disclosure, a "scaling factor" is a quantitative coefficient or adjustment ratio computed by the normalization model 152 and applied by the processor to modify a raw or pre-normalized value magnitude 128 so that it conforms to a canonical reference scale. In an embodiment, the scaling factor 154 may be expressed as a scalar value, a vector of feature-wise coefficients, and/or a matrix representing multi-dimensional scaling relationships across correlated attributes. In certain embodiments, the scaling factor 154 may include both multiplicative and additive components, enabling the model to perform affine transformations that align disparate distributions to the canonical scale. For purposes of this disclosure, "transformation parameters" refer to learned or predefined variables that characterize how the normalization model 152 maps input data from one domain or distribution to another. In an embodiment, transformation parameters may include, without limitation, slope coefficients, intercepts, learned biases, non-linear activation weights, kernel parameters, and/or statistical moments (e.g., mean, variance, skewness) associated with the data distribution. The normalization model 152 may dynamically compute these parameters based on the derivation context 126 of each data object, for instance, recognizing that a leadership maturity score measured on a five-point ordinal scale requires different transformation parameters than a marketing performance metric measured as a floating-point ratio.

Still referring to FIG. 1, in an embodiment, at least a processor 108 may supply the normalization model 152 with both the raw value magnitude 128 and a context vector derived from the data object's metadata. In an embodiment, the normalization model 152 may evaluate a set of transformation parameters specific to that context, calculate a corresponding scaling factor 154, and output the coefficient(s) to at least a processor 108 for application. For example, a marketing conversion rate with high variance may yield a smaller scaling factor 154 to prevent overemphasis in downstream analytics, while a stable leadership index may produce a larger factor reflecting higher confidence and predictive reliability. In an embodiment, at least a processor 108 may store each scaling factor 154 alongside its associated data object in the system's memory, allowing traceability of the specific normalization applied and facilitating recalibration during later optimization cycles. By determining scaling factors 154 as a function of transformation parameters linked to derivation context 126, system 100 may achieve adaptive, context-sensitive normalization that can respond to both inter-pipeline variability and intra-source statistical drift. This approach may ensure that each canonical feature value maintains numerical comparability while preserving information about its origin and statistical confidence.

With continued reference to FIG. 1, in an embodiment, normalizing the value magnitude 128 across each of the plurality of data objects may include generating a standard scaling factors 156 as a function of the scaling factor 154 of each of the plurality of heterogeneous data objects. For purposes of this disclosure, a "standard scaling factor" is a global calibration coefficient or set of coefficients computed by the processor to establish a common normalization baseline across all data objects mapped to the canonical data schema 122. In an embodiment, the standard scaling factors 156 may represent a statistical aggregation of the individual scaling factors 154 determined for each heterogeneous data object and may serve as a system-wide normalization reference that can be applied uniformly across features, entities, or processing cycles.

In further reference to FIG. 1, in an embodiment, at least a processor 108 may calculate the standard scaling factors 156 using aggregation functions such as mean, median, or weighted average, where the weighting parameters are derived from contextual confidence scores and/or data reliability metrics. For instance, scaling factors 154 computed from high-confidence data sources, such as stable survey aggregates, may contribute more heavily to the standard factor than those derived from transient marketing campaigns exhibiting greater variance. In an embodiment, at least a processor 108 may also apply robust statistical estimators, such as trimmed means, Winsorized averages, or interquartile medians, to minimize the influence of outlier scaling factors 154 and stabilize the normalization baseline. Once computed, the standard scaling factors 156 may be represented as a scalar value, a multi-dimensional tensor, and/or a matrix defining inter-feature dependencies. In an embodiment, at least a processor 108 may store the standard scaling factors 156 in association with a schema version identifier and derivation epoch metadata, allowing consistent reuse of that normalization reference for subsequent data ingestion cycles. In some embodiments, at least a processor 108 may dynamically update the standard scaling factors 156 over time by applying an exponential moving average or recursive least squares update rule, thereby allowing gradual adaptation to long-term distributional drift while maintaining backward compatibility with prior calibrated data. By generating a standard scaling factors 156 as a function of previously determined scaling factors 154, system 100 may produce a unifying normalization constant that anchors all canonical feature values to a stable, reproducible scale. This global calibration step may ensure that predictive modeling engines 130 and visualization layers downstream can interpret feature magnitudes consistently, independent of the pipeline or time period from which the data originated.

In continued reference to FIG. 1, in an embodiment, normalizing the value magnitude 128 across each of the plurality of data objects may include scaling the value magnitude 128 of each data object of the plurality of heterogeneous data objects as a function of the standard scaling factors 156. In an embodiment, at least a processor 108 may retrieve the standard scaling factors 156 from memory and apply it as a transformation coefficient to the normalized values of each data object. The scaling operation may be implemented as a mathematical mapping such that each canonical feature value $v_i$ associated with a data object is updated to $v_i'=f(v_i,S)$, where S denotes the standard scaling factors 156 and f(•) defines a transformation function selected according to schema configuration. In one embodiment, $f(v_i,S)$ may represent an affine transformation (e.g., $v_i'=S\times v_i+b$), while in another embodiment it may represent a non-linear or piecewise scaling function that adjusts sensitivity across defined value ranges. In an embodiment, at least a processor 108 may execute this scaling routine using vectorized and/or tensor-based arithmetic, enabling parallel application of the standard scaling factors 156 across large batches of data objects. In a distributed processing configuration, each compute node may apply the same standard scaling factors 156 locally to its assigned subset of data, ensuring consistent calibration across concurrent pipelines. The resulting rescaled canonical feature values may be written back to the system's memory as updated feature vectors or matrices tagged with version and timestamp metadata.

With further reference to FIG. 1, in an embodiment, at least a processor 108 may apply precision controls during the scaling operation, such as rounding to fixed decimal precision, clipping values exceeding upper or lower canonical bounds, and/or converting floating-point results to fixed-point representations for downstream model compatibility. After completion of the scaling process, at least a processor 108 may perform a validation check comparing statistical summaries, such as mean, variance, or kurtosis, of the newly scaled values against predefined canonical thresholds to verify normalization consistency. In an embodiment, deviations beyond acceptable tolerances may trigger an automatic recalibration routine or flag the affected data objects for further review by the optimization engine 184. By scaling each value magnitude 128 as a function of the standard scaling factors 156, system 100 may produce a harmonized dataset in which all canonical features are numerically aligned to a shared analytical scale. In an embodiment, this operation may establish the final step of the multi-source normalization pipeline, ensuring that all downstream predictive, visualization, and anomaly-detection modules operate on feature data that is both statistically comparable and contextually traceable.

Still referring to FIG. 1, in an embodiment, at least a processor 108 may be configured to generate, using a predictive modeling engine 130, a projection value object 132 as a function of the canonical feature data 124. For purposes of this disclosure, a "predictive modeling engine" is a computational subsystem configured to infer or forecast new values from previously normalized input features. In an embodiment, the predictive modeling engine 130 may include one or more machine-learning models, statistical estimators, or hybrid architectures. For example, the predictive modeling engine 130 may include, without limitation, neural networks, regression ensembles, transformer-based predictors, Bayesian estimators, and/or reinforcement-learning models, each selected based on the target prediction type and data characteristics. In an embodiment, the predictive modeling engine 130 may access canonical feature data 124 as model input, wherein such data provides a harmonized numerical representation of multi-source performance indicators, enabling the model to perform inference without distributional bias introduced by source heterogeneity. For purposes of this disclosure, a "projection value object" is a structured data artifact generated by the predictive modeling engine 130 that encapsulates one or more predicted or estimated values computed as a function of the canonical feature data 124. In an embodiment, a projection value object 132 may include, as non-limiting examples, forecasted growth rates, projected engagement indices, and/or predicted leadership improvement metrics associated with an entity 120. Each projection value object 132 may store not only the predicted values themselves but also accompanying metadata such as prediction confidence scores, feature attribution maps, or temporal validity intervals.

In continued reference to FIG. 1, in an embodiment, the predictive modeling engine 130 may be trained using supervised, unsupervised, or semi-supervised learning frameworks to learn functional relationships between canonical feature data 124 and target outcome variables. In an embodiment, during a training phase, at least a processor 108 may retrieve historical canonical feature datasets and corresponding ground-truth performance outcomes, such as verified growth trajectories, conversion improvements, and/or leadership maturity advancements, from the centralized data warehouse 138. At least a processor 108 may then, in some instances, partition the data into training, validation, and testing subsets and apply iterative optimization routines to minimize a defined loss function (e.g., mean squared error, cross-entropy, or Kullback-Leibler divergence) representing the deviation between predicted and observed outcomes. In an embodiment, the training process may involve back-propagation of error gradients through multiple transformation layers of the model, enabling system 100 to adjust weight matrices, bias terms, and non-linear activation parameters that define the predictive mapping. In certain embodiments, the predictive modeling engine 130 may implement context-aware training, wherein derivation context vectors or schema-version identifiers are included as auxiliary inputs, allowing the model to condition predictions on data provenance and distributional characteristics. In an embodiment, at least a processor 108 may further employ regularization techniques, such as dropout, L2 weight decay, and/or early stopping, to prevent overfitting and preserve model generalizability across evolving client datasets. In adaptive configurations, the predictive modeling engine 130 may periodically retrain or fine-tune its parameters using the most recent normalized data, enabling system 100 to capture temporal drift in underlying data relationships and continuously improve forecast accuracy over time.

With further reference to FIG. 1, in an embodiment, at least a processor 108 may execute the predictive modeling engine 130 by loading model parameters from memory 112, encoding the canonical feature data 124 into a model-compatible tensor representation, and performing one or more forward passes through the model's transformation layers to compute predicted outputs. The resulting projection value object 132 may then be serialized and stored in association with the entity identifier and timestamp, thereby enabling visualization or comparative analysis of predicted trajectories against observed data trends. In some embodiments, at least a processor 108 may further aggregate projection value objects 132 across entities to produce system-level forecasts or performance distributions. By generating projection value objects 132 as a function of canonical feature data 124, system 100 may transform normalized, multi-source inputs into predictive insights that can be rendered, analyzed, and monitored within a unified analytics framework. In an embodiment, this capability may enable cross-domain forecasting that preserves both accuracy and interpretability across heterogeneous data origins.

In further reference to FIG. 1, in an embodiment, generating the projection value object 132 may include encoding the canonical feature data 124 into a model-compatible representation 158. For purposes of this disclosure, a "model-compatible representation" is a structured numerical format that conforms to the input dimensional and type constraints of the predictive modeling engine 130. Because canonical feature data 124 may be organized in schema-based structures optimized for database storage or human-readable interpretation, at least a processor 108 may perform an encoding operation that reconfigures this data into a mathematically indexed, machine-interpretable representation suitable for high-performance computation. In an embodiment, at least a processor 108 may execute an encoding module configured to convert the canonical feature data 124 into numerical arrays by flattening, batching, or embedding each feature according to the model's architecture specification. For example, scalar features such as normalized engagement scores may be stored as single-value floats, categorical attributes such as leadership phase or firm type may be converted into one-hot or ordinal encodings, and textual metrics derived from survey responses may be represented as vector embeddings generated by a pre-trained language model. In an embodiment, at least a processor 108 may concatenate these encoded features into a unified tensor structure aligned with the model's expected input dimension. In some embodiments, the encoding process may include additional pre-processing stages, such as feature scaling, positional indexing, and padding to ensure dimensional consistency across entities. In an embodiment, at least a processor 108 may further store encoding metadata that records feature order, embedding method, and schema version, enabling consistent decoding and interpretability of model outputs. By encoding canonical feature data 124 into a model-compatible representation 158, system 100 may transform structured analytical data into a computationally optimized format that enables the predictive modeling engine 130 to execute forward passes efficiently and accurately across diverse input modalities.

With continued reference to FIG. 1, in an embodiment, generating the projection value object 132 may include generating a latent representation 160 of the model-compatible representation 158, wherein generating the latent representation 160 includes applying, within the predictive modeling engine 130, one or more transformation layers 162. For purposes of this disclosure, a "latent representation" is an internal, abstract numerical encoding of input data produced within the predictive modeling engine 130. In an embodiment, the latent representation 160 may be expressed as a dense, multi-dimensional vector or tensor that resides in a learned embedding space, wherein geometric relationships, such as distance, direction, or clustering, encode meaningful similarities or distinctions between entities. This representation may enable system 100 to generalize from observed data patterns and infer outcomes that are not explicitly represented in the original feature inputs. For purposes of this disclosure, a "transformation layer" is a computational subcomponent of the predictive modeling engine 130 configured to perform a mathematical or learned mapping between input and output spaces. In an embodiment, one or more transformation layers 162 may include, without limitation, fully connected (dense) layers, convolutional layers, recurrent layers, attention mechanisms, and/or other parametric modules that apply weight matrices, bias terms, and activation functions to transform data between representational states. Each layer may be defined by a set of learnable parameters stored in memory and updated during model training. In an embodiment, at least a processor 108 may apply these layers sequentially or in parallel according to the model's architecture definition to propagate encoded canonical feature data 124 through successive transformations. In an embodiment, at least a processor 108 may supply the model-compatible representation 158 as input to the first transformation layer of the predictive modeling engine 130. In an embodiment, the transformation layer may perform linear operations (e.g., matrix multiplication) followed by non-linear activation functions (e.g., ReLU, sigmoid, tanh, or GELU) to produce intermediate feature activations. Subsequent layers may refine these activations, extracting progressively more abstract relationships among canonical features, such as correlations between leadership maturity and cultural alignment or between marketing conversion rates and long-term engagement trends. In an embodiment, the final transformation layer may compress or project the intermediate activations into a latent vector of fixed dimensionality, representing the learned internal state of the model with respect to the input entity. In some embodiments, the predictive modeling engine 130 may include residual connections, normalization layers, or attention mechanisms to stabilize training and improve representation fidelity. The latent representation 160 generated through these transformation layers may be stored in transient memory or passed directly to subsequent computational stages for value prediction. By producing a latent representation 160 of the encoded canonical feature data 124, at least a processor 108 may effectively condense multi-source, multi-modal information into a compact, information-rich embedding that serves as the foundation for accurate projection value generation.

Still referring to FIG. 1, in an embodiment, generating the projection value object 132 may include calculating, as a function of the latent representation 160, a predicted value magnitude 164 for at least one canonical feature of the canonical feature data 124. For purposes of this disclosure, a "predicted value magnitude" is a numerical output generated by the predictive modeling engine 130 that estimates or forecasts the expected value of a canonical feature based on the learned relationships encoded within the latent representation 160. In an embodiment, the predicted value magnitude 164 may take the form of a scalar, vector, and/or tensor depending on the model's output dimensionality and may represent, as non-limiting examples, a projected engagement score, anticipated conversion efficiency, leadership maturity progression, and/or cultural alignment index for a given entity 120.

With further reference to FIG. 1, in an embodiment, at least a processor 108 may execute an inference layer within the predictive modeling engine 130, wherein the latent representation 160 serves as the input to one or more output transformation functions. In an embodiment, these functions may include parametric regression heads, classification logits, or probabilistic estimators that map latent embeddings to interpretable numerical predictions. In some embodiments, the predictive modeling engine 130 may apply a linear projection layer of the form $y=W\cdot h+b$, where h represents the latent vector, W is a learned weight matrix, and b is a bias term. In an embodiment, nonlinear variants may employ activation functions (e.g., sigmoid or softmax) to constrain the output range or produce multi-class probability distributions. In an embodiment, at least a processor 108 may perform these operations as vectorized computations over batches of latent representations 160, enabling simultaneous inference for multiple entities. The predicted value magnitude 164 may be accompanied by one or more auxiliary confidence metrics, such as standard deviation, entropy, or posterior probability, which quantify the reliability or uncertainty of the prediction. In some implementations, at least a processor 108 may compute ensemble predictions across multiple models and aggregate their outputs through averaging, voting, or Bayesian weighting to improve robustness. In an embodiment, the predicted value magnitude 164 may then be written to memory in association with the entity identifier, canonical feature label, timestamp, and model version identifier. By calculating a predicted value magnitude 164 as a function of the latent representation 160, system 100 may translate learned feature relationships into concrete numerical outputs that can be compared against observed values, incorporated into projection value objects 132, and displayed through the visualization interface 134 for forecasting or diagnostic analysis.

In continued reference to FIG. 1, in an embodiment, generating the projection value object 132 may include assembling the predicted value magnitude 164 into the projection value object 132. In an embodiment, at least a processor 108 may execute a projection assembly module that aggregates the predicted outputs generated by the predictive modeling engine 130 and serializes them into a structured data format, such as JSON, Protocol Buffers, or a binary tensor representation. In an embodiment, at least a processor 108 may construct an entity-level projection value object 132 including multiple predicted metrics, such as engagement forecast, leadership trajectory, and conversion growth projection, organized by canonical feature index. Each projection value object 132 may be stored in the system's centralized data warehouse 138 or intermediate cache and may be assigned a unique identifier to facilitate retrieval, version comparison, and synchronization with downstream modules. In some embodiments, at least a processor 108 may also compute additional post-processing values prior to final assembly, such as normalized prediction intervals, variance-adjusted confidence bounds, and/or derived secondary projections obtained by combining multiple predicted value magnitudes 128 under predefined analytical rules. Once assembled, the projection value object 132 may be transmitted to a visualization pipeline or a report-generation module configured to render the predictive results in graphical or tabular form. By assembling the predicted value magnitude 164 into a projection value object 132, system 100 may create a standardized, machine-interpretable output artifact that preserves the structure, provenance, and interpretability of predictive insights generated across heterogeneous data sources.

With continued reference to FIG. 1, in an embodiment at least a processor 108 may be configured to render, at a visualization interface 134, an output object 136 comprising the canonical feature data 124 and the projection value object 132. For purposes of this disclosure, a "visualization interface" is a graphical or programmatic display layer configured to present analytical, predictive, and diagnostic information generated by the system in a structured, human-interpretable format. In an embodiment, the visualization interface 134 may include, without limitation, a web-based dashboard, a desktop application window, a mobile user interface, and/or an API-driven rendering environment that outputs graphical or tabular data elements to a connected display. The visualization interface 134 may be implemented using rendering engines compatible with modern graphical frameworks, such as WebGL, React, or D3.js, and may communicate with backend data services using secure, authenticated channels. For purposes of this disclosure, an "output object" refers to a structured digital construct generated by at least a processor 108 that aggregates multiple categories of processed data into a unified representation configured for rendering at the visualization interface 134. In an embodiment, the output object 136 may include one or more data layers, each corresponding to a particular analytic dimension (e.g., observed performance metrics, predicted values, anomaly indicators, or contextual metadata). In some embodiments, the output object 136 may include schema-linked identifiers, timestamps, confidence metrics, and/or formatting directives defining how individual elements are to be displayed or arranged. In an embodiment, the output object 136 thus may function as an intermediary between computational subsystems and the user-facing visualization engine, ensuring that heterogeneous analytical results are transmitted in a coherent, render-ready format that preserves both structural integrity and contextual meaning.

In further reference to FIG. 1, in an embodiment, at least a processor 108 may generate an output object 136 that integrates canonical feature data 124, representing the normalized, observed performance values, with one or more projection value objects 132, representing model-generated forecasts or inferred trends. This output object 136 may be constructed as a composite data structure containing both static (historical) and dynamic (predictive) elements, enabling real-time comparative visualization of observed outcomes versus model projections. In an embodiment, at least a processor 108 may serialize the output object 136 into a render-ready format, such as a JSON or protocol-buffer payload, and transmit it to the visualization interface 134, where it is decoded and drawn as graphical or textual elements on the display. In some embodiments, the visualization interface 134 may be interactive, allowing users to select entities, adjust temporal ranges, and/or toggle between different visualization modes (e.g., trend curves, anomaly flags, or confidence intervals). In an embodiment, at least a processor 108 may synchronize updates between backend data changes and the visualization layer using an event-driven rendering engine, ensuring that canonical feature updates and new projection value objects 132 are reflected immediately in the user interface. By rendering the output object 136 at the visualization interface 134, system 100 may transform the results of multi-source data calibration and predictive modeling into actionable visual insights, providing users with a cohesive, real-time understanding of entity performance trajectories across operational domains.

With further reference to FIG. 1, in an embodiment, rendering the output object 136 at the visualization interface 134 may include selecting, from the canonical feature data 124 and the projection value object 132, a subset of data elements 166 to display as a function of a rendering rule set 168. For purposes of this disclosure, a "subset of data elements" is a selected group or portion of available data attributes, values, or visual components extracted from the complete output object 136 for presentation at a given time or within a specified context. In an embodiment, data elements may include, without limitation, canonical feature values (e.g., normalized engagement, conversion efficiency, leadership maturity index), projection value magnitudes 128 (e.g., predicted growth rates or trend trajectories), metadata fields (e.g., timestamps or confidence scores), and/or contextual indicators (e.g., anomaly markers or variance thresholds). The subset of data elements 166 may be dynamically determined based on user role, display constraints, and/or analytical priority, ensuring that the visualization interface 134 presents only the most relevant and contextually appropriate information for a given use case.

Still referring to FIG. 1, for purposes of this disclosure, a "rendering rule set" is a collection of rules executed by the processor to determine which data elements of the output object 136 should be visualized, how they should be prioritized, and under what conditions they should be updated or hidden. In an embodiment, the rendering rule set 168 may include a collection of display control parameters, conditional logic statements, and/or algorithmic expressions. In some cases, rendering rules may be defined declaratively in configuration files, programmatically within the visualization engine, or adaptively through learned preference models that adjust based on user behavior or system feedback. In an embodiment, the rendering rule set 168 may specify, for example, that only canonical features exceeding a defined change threshold are to be displayed, that projection values with low confidence scores are to be de-emphasized or filtered out, and/or that anomaly indicators are to be highlighted when performance deviations exceed statistical tolerance bounds. In an embodiment, at least a processor 108 may retrieve the rendering rule set 168 from memory, evaluate each rule against the contents of the output object 136, and generate a display selection map identifying which subset of data elements 166 meet visualization criteria. In an embodiment, at least a processor 108 may then transmit this selection map to the rendering engine, which may draw only the corresponding elements on the visualization interface 134. In some embodiments, the rendering rule set 168 may support hierarchical or temporal filtering, such that the subset of displayed data dynamically changes based on user input, screen resolution, or data-update frequency. By applying the rendering rule set 168 to select a subset of data elements 166, system 100 may ensure that the visualization interface 134 remains both contextually focused and computationally efficient, presenting a concise yet complete representation of entity performance and predictive insights.

In continued reference to FIG. 1, in an embodiment, rendering the output object 136 at the visualization interface 134 may include formatting the subset of data elements 166 into a layout configuration 170 including a plurality of interface elements 172. For purposes of this disclosure, a "layout configuration" is an organized structural arrangement of visual components that define how selected data elements are positioned, grouped, and displayed within the visualization interface 134. In an embodiment, the layout configuration 170 may be instantiated as a schema or template stored in memory, specifying parameters such as grid spacing, container dimensions, font hierarchies, color mappings, and/or dynamic scaling rules. In some embodiments, the layout configuration 170 may be represented as a structured data model (e.g., a JSON layout specification or XML view hierarchy) that the rendering engine interprets to construct the final interface view. For purposes of this disclosure, an "interface element" refers to a discrete visual or interactive component rendered within the visualization interface 134 to represent one or more data elements. In an embodiment, the plurality of interface elements 172 may include, without limitation, graphical indicators (e.g., charts, progress bars, or trend lines), textual displays (e.g., labels, tooltips, or annotated metrics), or control elements (e.g., dropdowns, filters, or toggles). In an embodiment, each interface element of the plurality of interface elements 172 may be associated with metadata defining its input source, update frequency, and rendering priority. In an embodiment, at least a processor 108 may instantiate interface elements dynamically during runtime by referencing the display selection map and mapping each selected data element to a corresponding graphical or textual representation. In an embodiment, at least a processor 108 may execute a rendering orchestration module that formats the subset of data elements 166 according to layout configuration constraints. The module may allocate interface elements to defined grid regions, apply scaling transformations to fit viewport dimensions, and/or assign visual encoding properties (e.g., color, opacity, or stroke width) based on data values and rendering rules. In some embodiments, at least a processor 108 may apply responsive design logic such that the layout configuration 170 automatically adjusts to the resolution, orientation, or platform of the display device, ensuring consistent usability across desktop, mobile, and/or embedded environments. In an embodiment, the resulting formatted interface may provide a coherent visual framework in which canonical feature data 124 and projection value objects 132 are presented as interrelated, hierarchically structured components within the visualization interface 134.

Still referring to FIG. 1, in an embodiment, the layout configuration 170 may define one or more a graphical arrangement 174, a textual arrangement 176, a numerical arrangement 178, and a spatial hierarchy 180, wherein the spatial hierarchy 180 specifies relative positioning, grouping, and alignment of the plurality of interface elements 172 within the visualization interface 134. For purposes of this disclosure, a "graphical arrangement" is the structured placement, scaling, and orientation of visual components used to represent numerical or categorical data within the visualization interface 134. In an embodiment, the graphical arrangement 174 may define rendering parameters including coordinate axes, chart types, plot boundaries, and/or proportional relationships between data-driven visual indicators. In some embodiments, at least a processor 108 may dynamically generate graphical arrangements 174 using visualization grammars or rendering libraries that map feature values to geometric primitives and color scales. For example, predicted growth trajectories may be rendered as line plots with confidence intervals shaded according to uncertainty, while anomaly indicators may be displayed as outlier markers along the same axis. For purposes of this disclosure, a "textual arrangement" is the configuration and formatting of alphanumeric content associated with data elements. In an embodiment, the textual arrangement 176 may specify typographic hierarchy, alignment, truncation behavior, and/or dynamic content binding for each textual element. In an embodiment, at least a processor 108 may automatically generate textual descriptors corresponding to canonical feature names, entity identifiers, and/or model outputs and place them in proximity to their associated graphical indicators according to predefined alignment rules. In some embodiments, the textual arrangement 176 may include adaptive text scaling and localization parameters, enabling the visualization interface 134 to adjust font size, language, or symbol representation based on user preferences or device specifications. For purposes of this disclosure, a "numerical arrangement" is a structured organization of quantitative data values displayed within the visualization interface. In an embodiment, a numerical arrangement 178 may include tabular, grid-based, or metric-panel configurations that present numerical magnitudes, ratios, confidence intervals, or other computed statistics derived from canonical feature data and projection value objects. In some embodiments, the numerical arrangement 178 may be dynamically generated by the at least a processor as a function of the rendering rule set, which determines the order, precision, and aggregation level of numerical values to be displayed. For example, a numerical arrangement 178 may include formatted performance metrics such as normalized engagement indices, predicted growth percentages, anomaly occurrence rates, or cross-pipeline contribution ratios. The numerical arrangement 178 may therefore serve as a quantitative counterpart to graphical and textual arrangements, enabling direct numerical comparison and interpretability of the predictive outputs rendered within the visualization interface.

In further reference to FIG. 1, for purposes of this disclosure, a "spatial hierarchy" is the ordered and relational structure that governs how interface elements are positioned, grouped, and layered within the visualization interface 134. In an embodiment, the spatial hierarchy 180 may define parent-child relationships between containers and sub-elements, establish relative coordinates, and/or specify z-index layering to control element overlap and depth perception. In an embodiment, at least a processor 108 may apply the spatial hierarchy 180 during layout computation to ensure that related interface elements, such as historical and predicted data views, are rendered adjacently or within shared containers, while secondary elements, such as annotations or alerts, are aligned relative to their corresponding primary data regions. In an embodiment, at least a processor 108 may compute spatial relationships in real time using layout constraint solvers or scene graph renderers to maintain visual consistency across viewport changes. By defining graphical and textual arrangements 176 within a spatial hierarchy 180, the layout configuration 170 may provide a unified framework through which system 100 can present normalized and predictive data in a visually coherent, logically ordered, and contextually rich display. In an embodiment, this hierarchical structure may allow the visualization interface 134 to maintain both analytical precision and interpretability across varied device types, data densities, and user interaction modes.

With further reference to FIG. 1, in an embodiment, the visualization interface 134 may include role-based access controls 182 (RBAC) configured to present different subsets of the output object 136 to different user classes. For purposes of this disclosure, "role-based access controls" (RBAC) is a set of authentication and authorization mechanisms implemented by at least a processor 108 to regulate visibility, interaction privileges, and data granularity within the visualization interface 134 based on predefined user roles or contextual credentials. In an embodiment, role-based access controls 182 may be instantiated as an access-control matrix or policy engine stored in memory, defining explicit permissions that map user roles to permissible actions and accessible data categories. For example, RBAC rules may specify that administrative users can view and modify all canonical feature data 124 and projection value objects 132, while coaching-level users are permitted to view entity-specific dashboards without access to global performance aggregates. For purposes of this disclosure, a "user class" is a defined category of users sharing common access privileges, data entitlements, or operational responsibilities within the system. Non-limiting examples of user classes may include administrators, system analysts, coaches, client-facing personnel, and/or firm leaders. In an embodiment, each user class may be associated with a credential profile that contains authentication tokens, encryption keys, and/or federated identity attributes used to validate access requests at login or API handshake.

In continued reference to FIG. 1, in an embodiment, at least a processor 108 may execute an access-control module that evaluates a user's credential profile and retrieves the corresponding RBAC policy. In an embodiment, the module may then generate a filtered representation of the output object 136 containing only those canonical feature data elements and projection value objects 132 authorized for that user class. This filtering may occur server-side, prior to transmission to the visualization interface 134, or client-side through dynamic rendering constraints. In some embodiments, RBAC enforcement may extend to interactive permissions, such that certain user classes can adjust predictive parameters, annotate data elements, and/or export results, while others have read-only capabilities. By implementing role-based access controls 182 and user-class differentiation within the visualization interface 134, system 100 may ensure secure, context-appropriate dissemination of analytical and predictive insights. In an embodiment, this architecture may allow multiple stakeholders to interact with the same underlying dataset while preserving data confidentiality, regulatory compliance, and operational integrity across user types and organizational tiers.

With continued reference to FIG. 1, in an embodiment, system 100 may be configured to capture user interaction data within the visualization interface 134 and apply such data as a feedback signal 186 to one or more optimization processes executed by at least a processor 108. For purposes of this disclosure, a "feedback signal" is any quantifiable indicator derived from user interactions, system performance metrics, or model deviations that can be used to refine internal computational behaviors. In an embodiment, feedback signals 186 may originate from multiple sources, including user interactions filtered through role-based access controls 182, statistical monitoring of prediction error rates, and/or automated detection of data drift within normalization and forecasting modules. Such signals may encode, as non-limiting examples, manual adjustments to visualization parameters, overrides of model predictions, reweighting of displayed metrics, and/or anomaly dismissals initiated by authorized user classes.

Still referring to FIG. 1, in an embodiment, at least a processor 108 may execute an optimization engine 184, wherein the optimization engine 184 is configured to update one or more threshold parameters of one or more models used by system 100 as a function of the feedback signal 186. For purposes of this disclosure, an "optimization engine" is a computational subsystem executed by at least a processor 108 and configured to evaluate system performance, interpret feedback data, and dynamically reconfigure operational parameters across one or more models in response to evolving conditions. In an embodiment, the optimization engine 184 may include parameter-tracking modules, gradient evaluators, and/or rule-based controllers that execute iterative updates in either real time or scheduled intervals. For purposes of this disclosure, a "threshold parameter" is a quantitative limit, cutoff, or sensitivity coefficient used by a computational model or subsystem to determine activation conditions, trigger events, or weighting adjustments. In an embodiment, one or more threshold parameters may govern, for example, the minimum deviation required to flag an anomaly, the confidence boundary used to accept a model prediction, and/or the scaling tolerance applied within normalization and visualization modules. Each threshold parameter may be stored within a configuration register or version-controlled parameter file and may be dynamically updated by the optimization engine 184 as new feedback is processed.

With further reference to FIG. 1, in an embodiment, at least a processor 108 may apply optimization algorithms, such as gradient descent, Bayesian hyperparameter optimization, or reinforcement-based reward updates, to modify threshold parameters based on the content and frequency of received feedback signals 186. For instance, if repeated user overrides indicate that a predictive model is overly conservative, the optimization engine 184 may decrease its activation threshold, thereby increasing model sensitivity. Conversely, if a visualization module produces excessive anomaly alerts acknowledged as false positives, the optimization engine 184 may raise its detection threshold or reweight the associated model output accordingly. In an embodiment, each update may be logged within a feedback ledger stored in memory, recording contextual metadata such as model identifier, feedback source, adjustment magnitude, and resulting performance delta. By integrating user-derived and system-derived feedback into an optimization feedback loop, system 100 may enable continuous improvement of its internal models and visualization logic. In an embodiment, the optimization engine 184 thus may serve as an adaptive control layer that harmonizes user behavior, analytical intent, and model calibration, ensuring that threshold parameters across normalization, predictive, and rendering subsystems remain tuned for stability, accuracy, and contextual relevance over time.

In further reference to FIG. 1, in an embodiment, at least a processor 108 may be configured to store the canonical data schema 122 in a centralized data warehouse 138. For purposes of this disclosure, a "centralized data warehouse" is a structured and scalable data storage environment configured to persistently maintain unified data representations, analytical feature objects, and associated schema definitions accessible to multiple system components or users. In an embodiment, the centralized data warehouse 138 may be implemented using a relational database management system (RDBMS), a distributed object store, and/or a hybrid cloud-based data lake architecture and may be optimized for high-volume ingestion and read/write efficiency. In an embodiment, at least a processor 108 may serialize the canonical data schema 122, including field definitions, mapping rules, data type constraints, and/or linkage structures, into a schema representation object. This object may be written to a schema registry or metadata table within the centralized data warehouse 138. In an embodiment, each schema version may be tagged with a unique identifier and associated with timestamp metadata, checksum validation values, and/or dependency references to ensure integrity and reproducibility. In some embodiments, system 100 may maintain backward compatibility across schema versions by including translation functions or migration scripts that allow previously ingested data to be reinterpreted under updated schema definitions. In an embodiment, at least a processor 108 may further implement synchronization logic to ensure that the canonical data schema 122 stored in the centralized data warehouse 138 remains consistent with schemas used by downstream modules, including normalization models 152, predictive modeling engines 130, and visualization interfaces 134. Such synchronization may occur through periodic polling, publish-subscribe notifications, and/or event-driven triggers that initiate schema refreshes when a modification is detected. In an embodiment, access to the canonical schema within the centralized data warehouse 138 may be controlled using authentication and role-based access controls 182, allowing different system components or user classes to retrieve schema definitions relevant to their operational context. By storing the canonical data schema 122 in a centralized data warehouse 138, system 100 may enable uniformity of data representation across multiple heterogeneous sources and ensure that all models and visualization components reference a consistent, authoritative schema definition. In an embodiment, this architecture may support scalability, maintainability, and version-controlled evolution of data structures over time, forming the backbone of the system's capacity to integrate and process multi-source data streams with technical precision.

Still referring to FIG. 1, in an embodiment, at least a processor 108 may be configured to detect, using an anomaly detection layer 140, an anomalous instance 142 within a data object of the plurality of heterogenous data objects 118. For purposes of this disclosure, an "anomaly detection layer" is a computational subsystem or model stack configured to identify deviations, irregularities, or inconsistencies within structured or semi-structured data relative to expected patterns derived from statistical, heuristic, or learned baselines. In an embodiment, the anomaly detection layer 140 may operate as a dedicated processing module integrated within the system's normalization or predictive modeling pipeline and may include one or more algorithmic models, such as clustering-based detectors, autoencoders, isolation forests, or probabilistic density estimators, executed by at least a processor 108. An "anomalous instance," for purposes of this disclosure, refers to a data point, value, or feature vector within a data object that exhibits statistical deviation, logical inconsistency, or relational misalignment relative to the canonical data schema 122 or to learned distributional parameters. Non-limiting examples of anomalous instances 142 in the context of the present system may include: (i) a marketing conversion rate that exceeds or falls significantly below an empirically expected range based on similar entities, (ii) a leadership maturity score with incomplete or contradictory underlying survey data, and/or (iii) a cultural sentiment metric whose trend diverges from other correlated firm performance indicators.

In continued reference to FIG. 1, in an embodiment, at least a processor 108 may execute the anomaly detection layer 140 to evaluate normalized data streams or canonical feature representations in real time or batch mode. In an embodiment, the layer may first encode each data object into a latent vector space using learned feature embeddings, then compute a deviation score or anomaly likelihood for each vector relative to reference distributions maintained in the system's centralized data warehouse 138. Threshold parameters, as previously defined, may be applied to determine whether a detected deviation qualifies as an anomalous instance 142. In an embodiment, when the computed anomaly score exceeds a defined detection threshold, at least a processor 108 may mark the corresponding data segment as anomalous and flag it for further processing, remediation, or visualization. In an embodiment, the anomaly detection layer 140 may further maintain adaptive models that recalibrate baseline expectations as more data is ingested and normalized over time. This continuous adaptation may enable system 100 to distinguish between genuine outliers and natural shifts in firm or entity behavior. By detecting anomalous instances 142 early in the data pipeline, system 100 may enhance both the reliability and contextual fidelity of downstream predictive modeling, ensuring that subsequent projections and visualizations are not skewed by corrupted, incomplete, or out-of-distribution data.

With further reference to FIG. 1, in an embodiment, at least a processor 108 may be configured to generate an anomaly indicator object 144 as a function of detecting the anomalous instance 142. For purposes of this disclosure, an "anomaly indicator object" is a structured digital record generated by the system to represent one or more anomalous instances 142 detected within the data pipeline. In an embodiment, the anomaly indicator object 144 may include one or more metadata fields describing the anomaly's origin, severity, temporal characteristics, and relational context within the canonical data schema 122. In some embodiments, each anomaly indicator object 144 may be uniquely indexed to the corresponding data object, thereby maintaining traceability across normalization, modeling, and visualization layers. In an embodiment, at least a processor 108 may instantiate an anomaly indicator object 144 upon determining that a data element's deviation score exceeds the active detection threshold within the anomaly detection layer 140. In an embodiment, the anomaly indicator object 144 may encapsulate, without limitation: (i) an object identifier referencing the affected data object, (ii) an anomaly class (e.g., statistical outlier, missing value, pattern inconsistency, temporal drift), (iii) a severity score derived from the magnitude of deviation relative to baseline parameters, (iv) a timestamp of detection, (v) a derivation context descriptor identifying the originating data pipeline (e.g., marketing, leadership maturity, or cultural sentiment), and/or (vi) optional recommendation fields indicating potential corrective actions or confidence intervals. Once generated, the anomaly indicator object 144 may be serialized and stored within a dedicated anomaly registry or integrated metadata table in the centralized data warehouse 138. In an embodiment, at least a processor 108 may further associate each anomaly indicator object 144 with a corresponding feedback hook, enabling downstream processes, including the optimization engine 184 and visualization subsystems, to access and respond to anomaly information in real time. For example, when a significant deviation is detected in leadership maturity scoring data, the visualization interface 134 may display a visual flag or warning icon adjacent to the affected metric, while the optimization engine 184 may adjust related model thresholds or reweight pipeline contributions to mitigate recurring variance. In some embodiments, the anomaly indicator object 144 may serve as a persistent audit artifact, maintaining a record of historical anomalies and their resolution outcomes. This may enable longitudinal tracking of system reliability and supports continuous calibration of detection models. By encoding detected deviations into discrete, structured objects, system 100 may ensure that anomalous behavior is explicitly represented, traceable across modules, and actionable by both automated and human operators.

In continued reference to FIG. 1, in an embodiment, at least a processor 108 may be configured to generate an alert signal 146 as a function of the anomaly indicator object 144. For purposes of this disclosure, an "alert signal" is a system-generated digital transmission that encodes metadata, contextual information, and actionable indicators corresponding to a detected anomalous instance 142. In an embodiment, the alert signal 146 functions as an event-level notification object produced when an anomaly indicator object 144 satisfies one or more predefined alerting conditions, such as exceeding a critical severity threshold, recurring across successive data ingestion cycles, and/or impacting downstream predictive model performance. In an embodiment, at least a processor 108 may instantiate an alert signal 146 by serializing relevant information from the anomaly indicator object 144 into a standardized message format, such as a JSON schema, binary packet, or message queue object. The alert signal 146 may include, as non-limiting examples: (i) a signal identifier unique to each event, (ii) a source reference indicating the originating pipeline or subsystem (e.g., marketing metrics stream, leadership scoring module, or cultural sentiment model), (iii) a severity field quantifying deviation magnitude, (iv) a diagnostic payload summarizing contextual parameters from the anomaly indicator object 144, and/or (v) an optional recommendation vector indicating potential corrective actions or reprocessing instructions.

With continued reference to FIG. 1, in an embodiment, at least a processor 108 may further apply routing logic or a message-broker protocol (e.g., Kafka, MQTT, or AMQP) to publish the alert signal 146 to subscribed monitoring interfaces 148 or control modules. In some embodiments, system 100 may prioritize alerts using a tiered classification framework such that only high-severity or high-impact anomalies trigger real-time notifications, while lower-severity signals are logged for batch review. Additionally, the alert generation process may incorporate adaptive learning, wherein the optimization engine 184 refines alert thresholds based on user acknowledgment patterns or false-positive feedback received through the visualization interface 134. By generating an alert signal 146 as a structured, context-rich communication object, system 100 may ensure that anomaly information is not merely detected but also actively propagated through its technical ecosystem, enabling responsive adaptation across the affected data pipelines and maintaining operational transparency across distributed subsystems.

Still referring to FIG. 1, in an embodiment, at least a processor 108 may be configured to transmit the alert signal 146 to a monitoring interface 148 of a source pipeline 150. For purposes of this disclosure, a "source pipeline" is a data ingestion or transformation process that produces or supplies heterogeneous data objects to the system. In an embodiment, each source pipeline 150 may include one or more upstream modules, such as marketing analytics streams, leadership maturity scoring workflows, or cultural survey data processors, that independently compute, format, and export data to the system for canonical mapping. These pipelines may vary in their operational cadence, data type, or transformation logic, resulting in the heterogeneity the system is designed to reconcile. For purposes of this disclosure, a "monitoring interface" is a system or module endpoint configured to receive diagnostic, alerting, or telemetry data related to the operational state of a corresponding source pipeline 150. In an embodiment, the monitoring interface 148 may include a graphical or programmatic environment capable of rendering real-time system metrics, receiving alert signal 146, and optionally responding with control commands or acknowledgment messages. In some embodiments, the monitoring interface 148 may be implemented as a web-based control dashboard, an application programming interface (API) endpoint, or an internal service node integrated with the source pipeline's orchestration layer.

With further reference to FIG. 1, in an embodiment, when an alert signal 146 is generated based on the detection of an anomalous instance 142, at least a processor 108 may determine the appropriate source pipeline 150 by referencing metadata stored within the anomaly indicator object 144, such as its derivation context 126 or pipeline identifier. In an embodiment, at least a processor 108 may then serialize and transmit the alert signal 146 to the corresponding monitoring interface 148 using a secure communication protocol such as HTTPS, gRPC, or a message-broker architecture (e.g., Kafka, RabbitMQ). Each transmission may include authentication tokens, encryption headers, and/or payload integrity checksums to ensure secure and verifiable delivery. Upon receipt, the monitoring interface 148 of the source pipeline 150 may log, display, or process the alert signal 146 depending on its configuration. For example, if the anomaly originated in a marketing metrics ingestion process, the alert may be routed to a dashboard displaying campaign conversion health metrics; alternatively, a leadership scoring pipeline may trigger an automated recalibration of survey weighting or prompt a human analyst for data validation. In certain embodiments, the monitoring interface 148 may generate a return acknowledgment or status message that is ingested by the system's optimization engine 184, allowing the alert-response process to form part of the closed-loop feedback cycle that continuously improves pipeline stability and data fidelity. By transmitting the alert signal 146 to the monitoring interface 148 of the source pipeline 150, system 100 may extend anomaly awareness beyond internal analytics to the data generation layer itself, enabling upstream correction, cross-pipeline coordination, and sustained integrity of multi-source data ecosystems.

In further reference to FIG. 1, in an embodiment, at least a processor may be configured to receive and process acknowledgment messages or feedback responses from the monitoring interface 148 of the source pipeline 150 and to apply such feedback as an input to the optimization engine 184. For purposes of this disclosure, a "feedback response" or "acknowledgment message" refers to a structured communication returned by the monitoring interface 148 to confirm receipt of an alert signal 146, provide diagnostic context, or supply corrective parameters derived from upstream processing logic. In an embodiment, feedback responses may include information such as validation results, manual overrides performed by human operators, updated transformation coefficients, and/or new operational thresholds computed by the pipeline's own self-correcting algorithms. In an embodiment, at least a processor 108 may deserialize the acknowledgment message, extract its payload, and generate a feedback signal 186 object configured for ingestion by the optimization engine 184. Each feedback signal 186 may include contextual metadata such as the source pipeline identifier, associated anomaly identifier, response timestamp, and one or more adjustment directives (e.g., modify scaling factor 154, update normalization model 152 weight, or adjust alert severity tolerance). In an embodiment, the optimization engine 184 may then evaluate the relevance and reliability of the received feedback using validation logic, ensuring that only verified, high-confidence signals contribute to system recalibration.

Still referring to FIG. 1, in an embodiment, upon validation, the optimization engine 184 may update one or more threshold parameters, such as anomaly detection sensitivity, normalization bounds, or predictive model confidence levels, based on the aggregated feedback signal 186. For instance, if repeated acknowledgment messages from a marketing data pipeline indicate that certain conversion rate anomalies are legitimate seasonal fluctuations rather than errors, the optimization engine 184 may increase tolerance thresholds for that data class. Conversely, if a leadership scoring pipeline reports multiple confirmed anomalies, the optimization engine 184 may decrease the detection threshold or assign a higher weighting to that data stream in future model iterations. In an embodiment, each update may be logged in a parameter registry stored in the centralized data warehouse 138, allowing system 100 to maintain a transparent history of configuration adjustments. At least a processor 108 may, in some instances, further trigger a re-evaluation cycle within downstream models, ensuring that recalibrated parameters are applied during subsequent data ingestion and normalization operations. In an embodiment, through this bi-directional feedback pathway, wherein the monitoring interface 148 transmits corrective feedback and the optimization engine 184 updates operational thresholds, system 100 may achieve continuous synchronization between data generation, processing, and analytics layers. This closed-loop mechanism may enhance system adaptability, reduce false-positive anomalies, and ensure that performance insights rendered in the visualization interface 134 accurately reflect the most current, validated data conditions.

With continued reference to FIG. 1, in an embodiment, system 100 may include governance and version-control mechanisms configured to ensure traceable, auditable, and reversible management of parameter updates derived from feedback responses. For purposes of this disclosure, a "governance mechanism" is a structured control framework that defines rules, validation procedures, and access permissions governing the modification of system parameters or model configurations. In an embodiment, such governance may be implemented through a parameter management service that operates in conjunction with the centralized data warehouse 138 and optimization engine 184. When the optimization engine 184 computes an update to one or more threshold parameters, at least a processor 108 may record the proposed change in a parameter registry, along with contextual metadata including: the originating feedback signal 186, associated model identifier, version of the canonical data schema 122 active at the time of update, timestamp of modification, and/or a computed performance delta representing anticipated improvement. In an embodiment, before a parameter update is committed, the governance mechanism may invoke a validation routine that evaluates potential downstream effects across dependent models and pipelines. For example, if a normalization threshold is modified, the validation routine may ensure that the change will not violate boundary constraints or introduce drift in related predictive models. In an embodiment, each committed parameter change may be versioned and assigned a unique configuration hash, allowing system 100 to maintain rollback capability. In the event that a subsequent performance audit or feedback cycle identifies instability, system 100 may automatically or manually revert to a prior configuration stored in the registry. In an embodiment this rollback process may leverage dependency graphs, which define interrelationships among models, scaling functions, and visualization rules, ensuring that reversion of one parameter set does not inadvertently disrupt dependent subsystems.

In continued reference to FIG. 1, in some embodiments, governance may also include access control logic that restricts parameter modification authority to designated user classes or automated agents validated through cryptographic credentials. In an embodiment, the governance framework may further integrate with the anomaly registry and feedback ledger to generate compliance-ready audit trails that capture every instance of threshold adjustment, validation outcome, and rollback event. By enforcing structured governance, versioning, and dependency-aware validation, system 100 may ensure that adaptive updates driven by the optimization engine 184 remain transparent, reversible, and technically coherent across all layers of the data processing architecture.

With continued reference to FIG. 1, in an embodiment, system 100 may be configured to perform automated validation and simulation cycles prior to deploying updated threshold parameters, model weights, or normalization rules into live operational pipelines. For purposes of this disclosure, an "automated validation cycle" is a pre-deployment testing process in which the system evaluates proposed parameter updates against historical or synthetic datasets to ensure performance stability, data integrity, and compliance with defined boundary conditions. In an embodiment, these validation cycles may be orchestrated by a dedicated validation controller module executed by at least a processor 108 and integrated with the optimization engine 184, parameter registry, and centralized data warehouse 138. In an embodiment, when the optimization engine 184 produces a parameter update proposal, the validation controller may initiate a simulation environment, sometimes referred to as a "shadow" or "staging" environment, that mirrors active production conditions without altering live data flows. Within this sandboxed environment, at least a processor 108 may execute replay analysis, wherein archived data objects or canonical feature datasets are reprocessed using both the current and proposed parameter configurations. In an embodiment, system 100 may then compare the resulting output objects 136 across a range of evaluation metrics, including prediction accuracy, anomaly rate variance, latency, and consistency of visualized insights.

Still referring to FIG. 1, in an embodiment, ff the validation cycle determines that the proposed configuration improves or maintains performance within acceptable tolerances, the update may be automatically approved for promotion into production. Conversely, if validation results reveal increased instability, such as excessive anomaly flags, degraded model confidence, or schema compatibility conflicts, the update may be flagged for review or automatically reverted. In some embodiments, system 100 may execute A/B verification, wherein the updated configuration is temporarily deployed to a subset of data pipelines or entities to compare real-world performance against the existing configuration. In an embodiment, the results of each validation or simulation cycle may be logged in a validation ledger, stored within the centralized data warehouse 138 alongside the parameter registry. Each ledger entry may include validation outcomes, performance deltas, test dataset identifiers, and/or decision statuses (e.g., approved, deferred, reverted). By automating validation and simulation cycles prior to deployment, system 100 may ensure that adaptive optimizations driven by feedback signals 186 undergo rigorous technical evaluation, preserving operational reliability and preventing inadvertent data drift or model bias across distributed pipelines.

Figure 2:
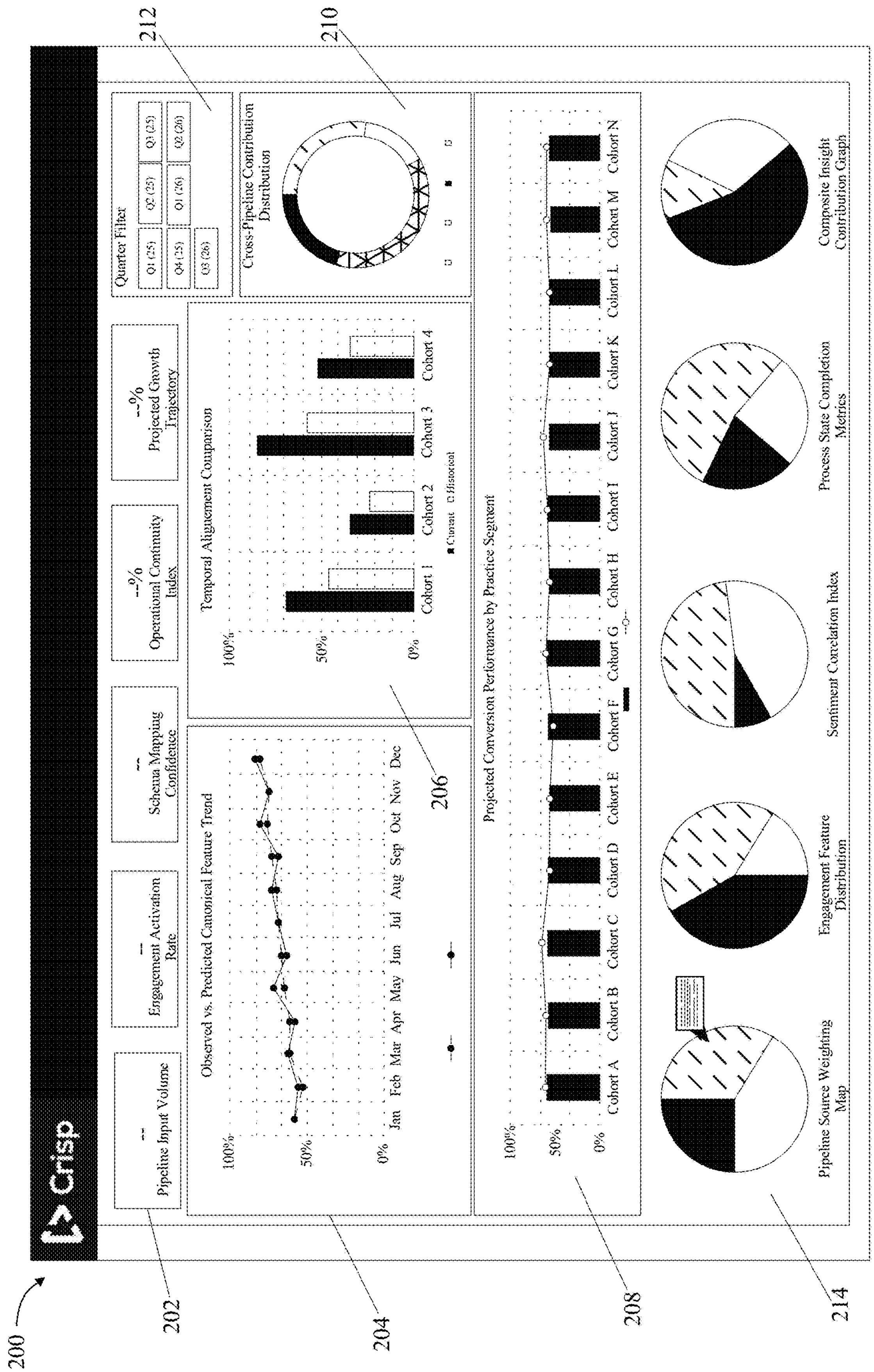
FIG. 2 is a diagram of an exemplary visualization interface.

Now referring to FIG. 2, a diagram of an exemplary visualization interface 200 is shown, illustrating a set of interface elements generated by the system as described in reference to FIG. 1. In an embodiment, visualization interface 200 may be instantiated by the at least a processor executing a rendering rule set to generate an output object comprising canonical feature data and projection value objects. The visualization interface 200 may present integrated cross-pipeline insights associated with a single entity, such as a law firm or a defined practice within the firm. Data visualizations, interactive filters, and hierarchical components of visualization interface 200 may be derived from canonical feature data that has been normalized and transformed by the predictive modeling engine as described above.

In continued reference to FIG. 2, in an embodiment, visualization interface 200 may include a metric panel 202 configured to display a plurality of key canonical feature metrics or projection-derived indicators. In some embodiments, each panel element within metric panel 202 may correspond to a canonical feature field or an aggregate projection computed by the predictive modeling engine. For example, as illustrated, panel elements may include "Predictive Input Volume," "Engagement Activation," "Schema-Mapping Confidence Index," "Operational Continuity Index," and/or "Predicted Growth Trajectory." Each value may represent either a normalized magnitude derived from heterogeneous source data or a projection value object output generated as a function of the canonical feature data. The metric panel 202 thus may enable high-level review of entity performance metrics derived from multiple heterogeneous data pipelines such as marketing, leadership, and cultural engagement systems.

With further reference to FIG. 2, in an embodiment, a trend visualization region 204 may be configured to display a temporal comparison between observed and predicted canonical feature trends. In an embodiment, the trend visualization region 204 may render a line chart generated from historical canonical feature values and corresponding projection value objects for matching time intervals. The trend visualization region 204 may therefore visualize deviations between normalized empirical data and model-generated predictions, enabling anomaly detection, calibration verification, and temporal performance tracking. A trend indicator 206 may mark specific inflection points or deviations detected by the anomaly detection layer, allowing users to interpret model behavior and identify potential irregularities in the underlying data pipelines.

Still referring to FIG. 2, in an embodiment, a projection comparison panel 208 may present a categorical or cohort-level analysis of model predictions across practice segments or other sub-entity divisions. In an embodiment, projection comparison panel 208 may be labeled as "Projected Conversion Performance by Practice Segment" and may include cohort indicators corresponding to specific canonical attribute values such as practice area, department, or regional unit. Each cohort bar may encode normalized or predicted metric values (e.g., engagement index, predicted conversion probability, or anomaly likelihood). Projection comparison panel 208 thus may provide a comparative visualization of how the predictive modeling engine interprets or forecasts performance across multiple sub-populations within the same entity.

With continued reference to FIG. 2, a cross-pipeline contribution distribution chart 210 may be included to visualize proportional contributions of heterogeneous data pipelines to the unified canonical feature space. In an embodiment, the cross-pipeline contribution distribution chart 210 may be implemented as a donut or ring-type visualization that encodes relative weighting of data sources such as marketing performance data, coaching metrics, leadership maturity scores, and cultural survey indicators. Each segment of the chart may correspond to a distinct data pipeline or feature subset, with segment magnitude representing the normalized influence of that pipeline on the canonical feature data or its derived projection value objects. The at least a processor may update the distribution dynamically in response to changes in pipeline weighting parameters or feedback signals received by the optimization engine. Accordingly, the cross-pipeline contribution distribution chart 210 may provide an interpretable graphical interface element within the visualization interface 200 that communicates the internal balance of source data contributions driving predictive model outputs.

In further reference to FIG. 2, in an embodiment, the visualization interface 200 may also include a temporal control and filter region, which in the illustrated embodiment functions as a "Quarter Filter." The quarter filter 212 may include selectable control elements (e.g., Q1, Q2, Q3, Q4) allowing the user to toggle between historical and predictive temporal intervals. In response to a user selection, the at least a processor may dynamically update rendered elements of visualization interface 200 based on time-indexed canonical feature data and projection value objects. This may allow side-by-side comparison of past, current, and forecasted performance within a unified interface, thereby illustrating the dynamic rendering capabilities of the visualization interface described in FIG. 1.

Still referring to FIG. 2, in an embodiment, a feature visualization panel 214 may include a series of graphical components, such as pie charts or composite breakdowns, each representing derived canonical features or normalized subcomponents of the projection output. Examples illustrated include "Engagement Feature Distribution," "Sentiment Correlation Index," "Process State Completion Metrics," and "Composite Insight Contribution Graph." Each visualization in panel 214 may be dynamically populated based on the canonical data schema and may update in real time when the underlying canonical feature data or projection value objects change. In combination, the visualization interface 200 thus may provide a unified and interactive output environment that integrates multi-source data into predictive, interpretable insights for a given entity or organizational subset.

Figure 3:
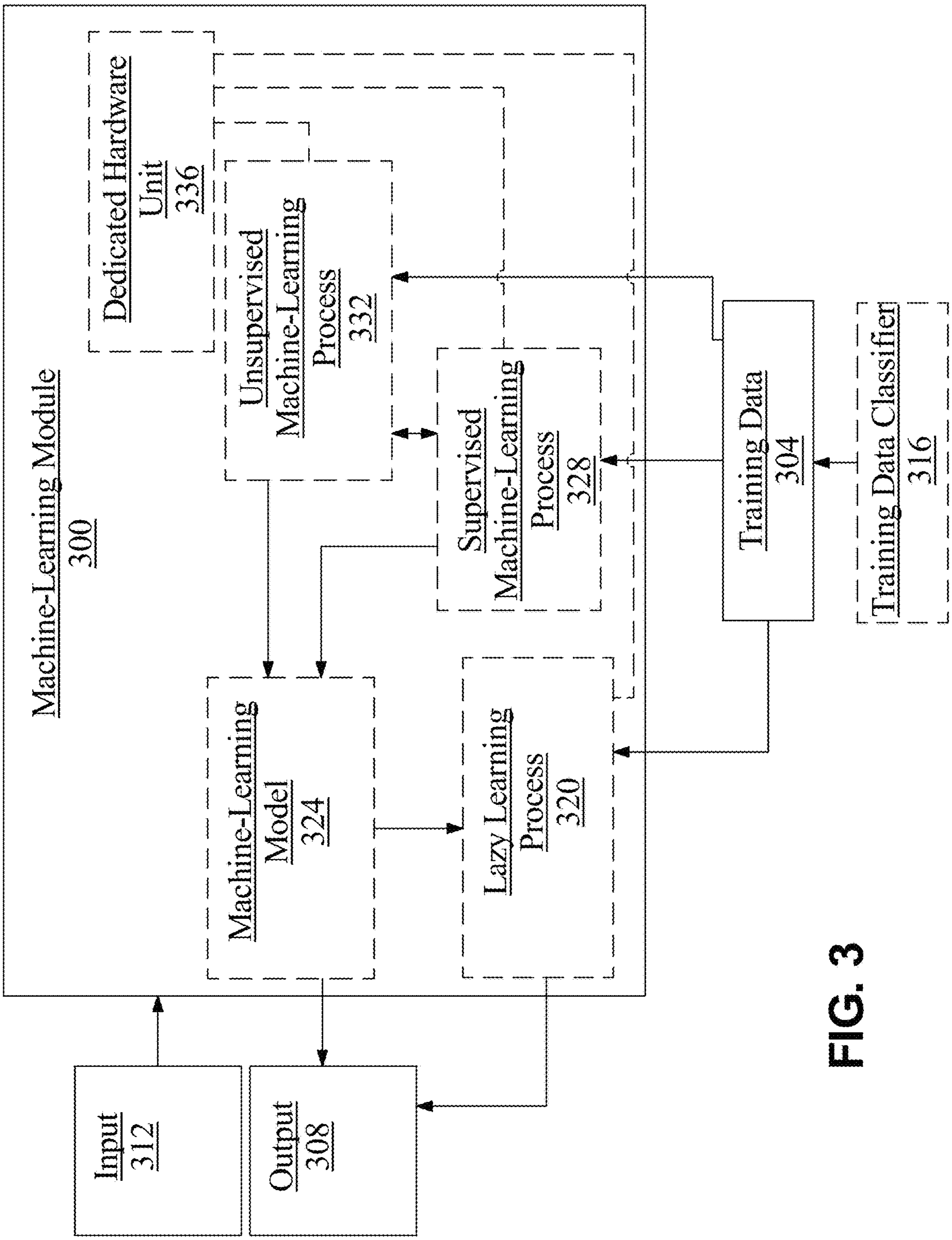
FIG. 3 is a diagram of an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include raw performance metrics ingested from heterogeneous pipelines, such as marketing results, client acquisition rates, leadership assessment scores, and cultural sentiment data, while output data may include predicted growth trajectories, normalized benchmark scores, or anomaly likelihood values generated by the system.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to sub-populations of law firms or organizational entities that exhibit correlated performance patterns across multiple data domains, such as marketing conversion efficiency, leadership maturity, or cultural engagement. In an embodiment, the classifier may output category labels identifying firm performance archetypes, such as "rapid-growth adopters," "steady-growth maintainers," or "stagnant-engagement entities." These classifications may enable the system to segment heterogeneous training data into more homogeneous groups, thereby improving downstream normalization accuracy, predictive model calibration, and benchmarking across comparable cohorts of entities.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l=\sqrt{\sum_{i=0}^{n}a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 3, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 3, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic “1” and “0” voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as “desired” results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
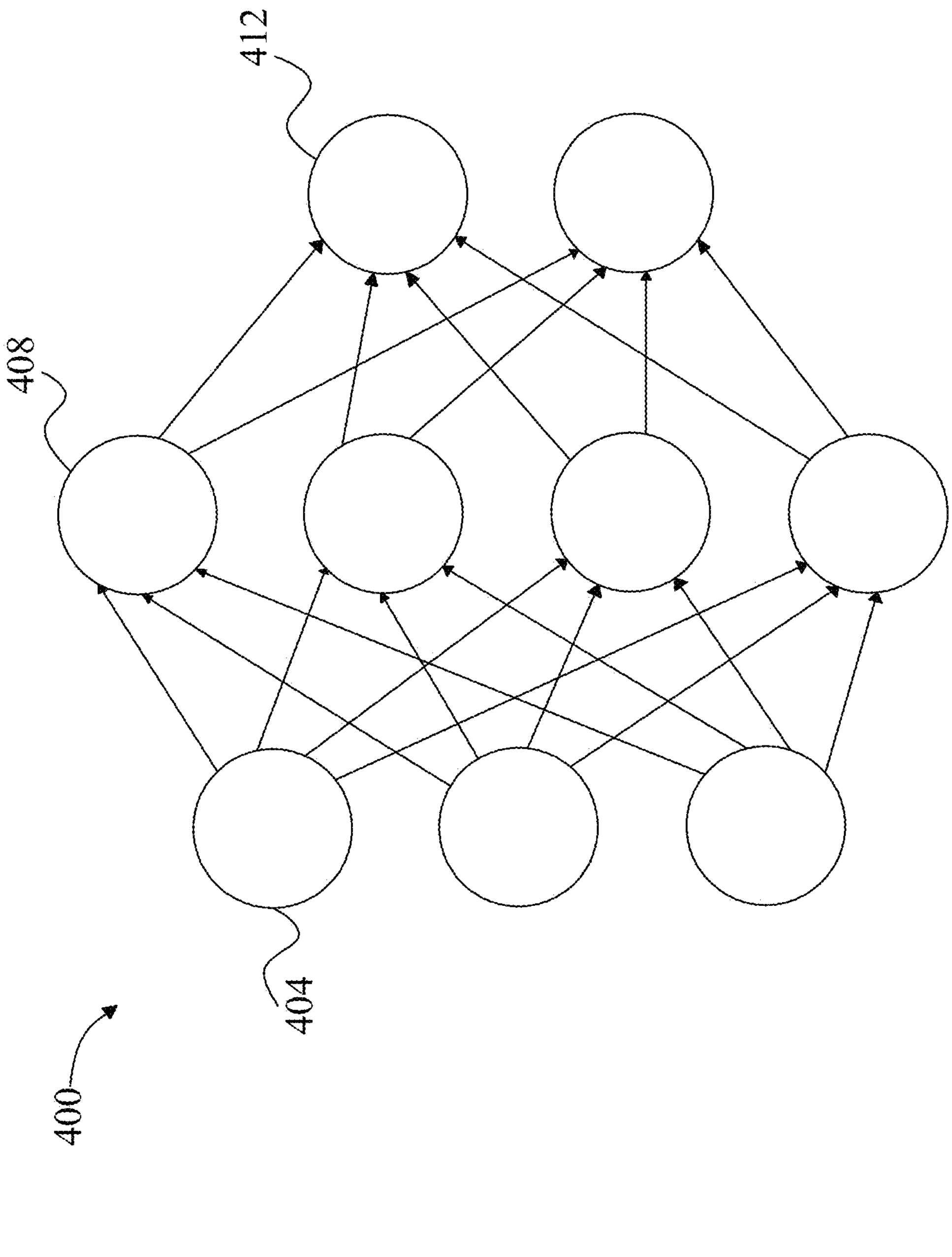
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
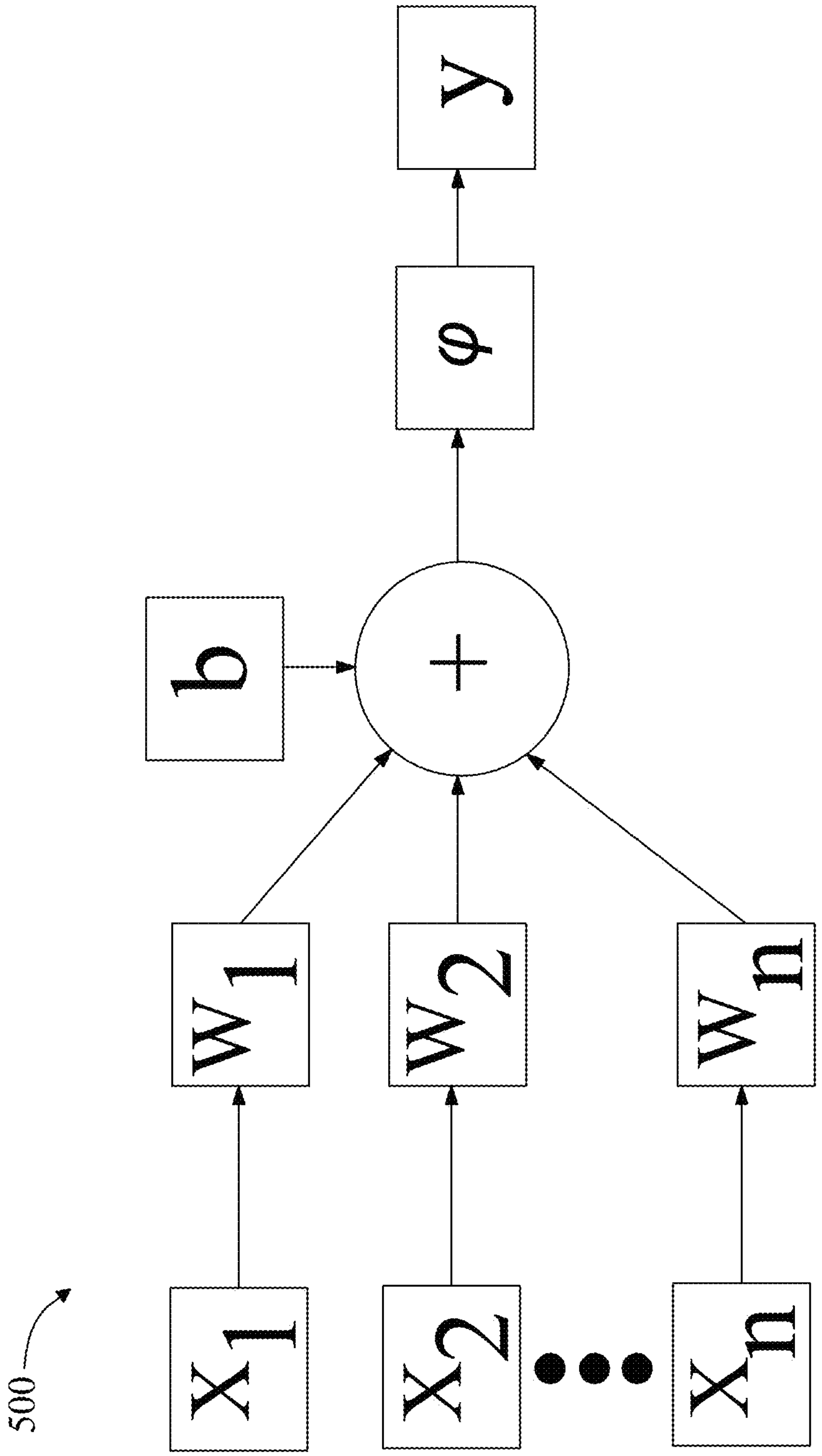
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as f(x)=max(0,x), a "leaky" and/or "parametric" rectified linear unit function such as f(x)=max (ax,x) for some a, an exponential linear units function such as $$f(x) = \begin{cases} x \text{ for } x \ge 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid (x), a Gaussian error linear unit function such as $f(x)=a\,(1+\tanh(\sqrt{2/\pi}(x+bx^r)))$ for some values of a, b, and r, and/or a scaled exponential linear unit function such as $$f(x) = \lambda\begin{cases} \alpha(e^x - 1) \text{ for } x < 0 \\ x \text{ for } x \ge 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
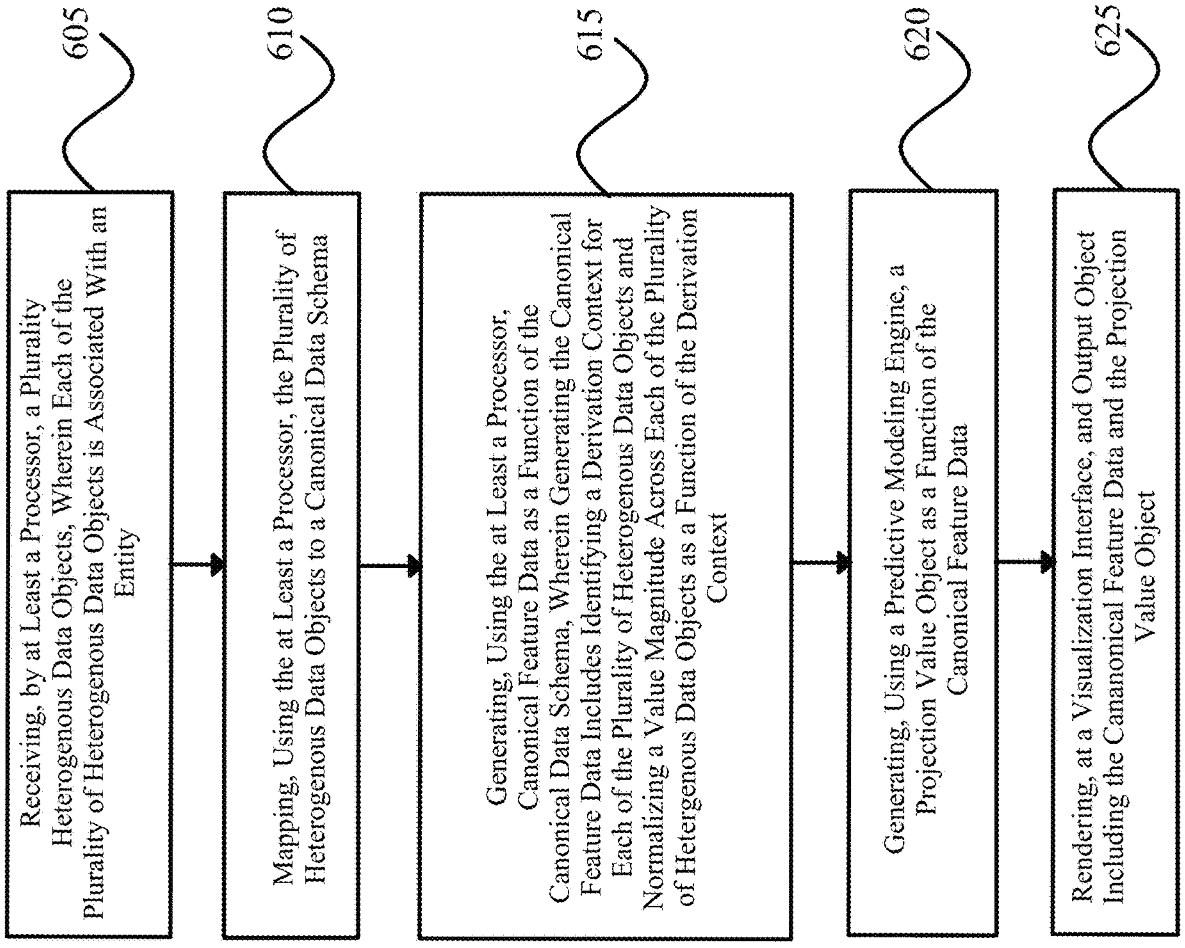
FIG. 6 is a flow diagram of an exemplary method of multi-source data calibration and predictive model rendering.

Referring now to FIG. 6, a flow diagram of an exemplary method 600 for multi-source data calibration and predictive model rendering is illustrated. Method 600 may include a step 605 of receiving, by at least a processor, a plurality of heterogeneous data objects, wherein each of the plurality of heterogenous data objects is associated with an entity. This may be implemented, without limitation, as referenced in FIGS. 1-5.

In continued reference to FIG. 6, method 600 may include a step 610 of mapping, using the at least a processor, the plurality of heterogenous data objects to a canonical data schema. This may be implemented, without limitation, as referenced in FIGS. 1-5.

With further reference to FIG. 6, method 600 may include a step 615 of generating, using the at least a processor, canonical feature data as a function of the canonical data schema, wherein generating the canonical feature data includes: identifying a derivation context for each of the plurality of heterogeneous data objects and normalizing a value magnitude across each of the plurality of data objects as a function of the derivation context. In an embodiment, normalizing the value magnitude across each of the plurality of data objects may include applying a normalization model to the plurality of heterogenous data objects, determining, using the normalization model, a scaling factor for each of the plurality of heterogeneous data objects as a function of transformation parameters associated with the derivation context of each of the plurality of heterogeneous data objects, generating a standard scaling factor as a function of the scaling factor of each of the plurality of heterogeneous data objects, and scaling the value magnitude of each data object of the plurality of heterogeneous data objects as a function of the standard scaling factor. This may be implemented, without limitation, as referenced in FIGS. 1-5.

Still referring to FIG. 6, method 600 may include a step 620 of generating, using a predictive modeling engine, a projection value object as a function of the canonical feature data. In an embodiment, generating the projection value object may include encoding the canonical feature data into a model-compatible representation, generating a latent representation of the model-compatible representation, wherein generating the latent representation includes applying, within the predictive modeling engine, one or more transformation layers, calculating, as a function of the latent representation, a predicted value magnitude for at least one canonical feature of the canonical feature data, and assembling the predicted value magnitude into the projection value object. This may be implemented, without limitation, as referenced in FIGS. 1-5.

With continued reference to FIG. 6, method 600 may include a step 625 of rendering, at a visualization interface, an output object comprising the canonical feature data and the projection value object. In an embodiment, rendering the output object at the visualization interface may include selecting, from the canonical feature data and the projection value object, a subset of data elements to display as a function of a rendering rule set and formatting the subset of data elements into a layout configuration including a plurality of interface elements. In an embodiment, the layout configuration may define one or more of a graphical arrangement, a textual arrangement, a numerical arrangement, and a spatial hierarchy, wherein the spatial hierarchy specifies relative positioning, grouping, and alignment of the plurality of interface elements within the visualization interface. In an embodiment, the visualization interface may include role-based access controls configured to present different subsets of the output object to different user classes. This may be implemented, without limitation, as referenced in FIGS. 1-5.

In further reference to FIG. 6, method 600 may include storing, using the at least a processor, the canonical data schema in a centralized data warehouse. This may be implemented, without limitation, as referenced in FIGS. 1-5.

Still referring to FIG. 6, method 600 may include detecting, using an anomaly detection layer, an anomalous instance within a data object of the plurality of heterogenous data objects and generating, using the at least a processor, an anomaly indicator object as a function of detecting the anomalous instance. In an embodiment, method 600 may further include generating, using the at least a processor, an alert signal as a function of the anomaly indicator object and transmitting, using the at least a processor, the alert signal to a monitoring interface of a source pipeline. This may be implemented, without limitation, as referenced in FIGS. 1-5.

In continued reference to FIG. 6, method 600 may include executing, using the at least a processor, an optimization engine, wherein the optimization engine is configured to update one or more threshold parameters of one or more models used throughout the method as a function of a feedback signal. This may be implemented, without limitation, as referenced in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
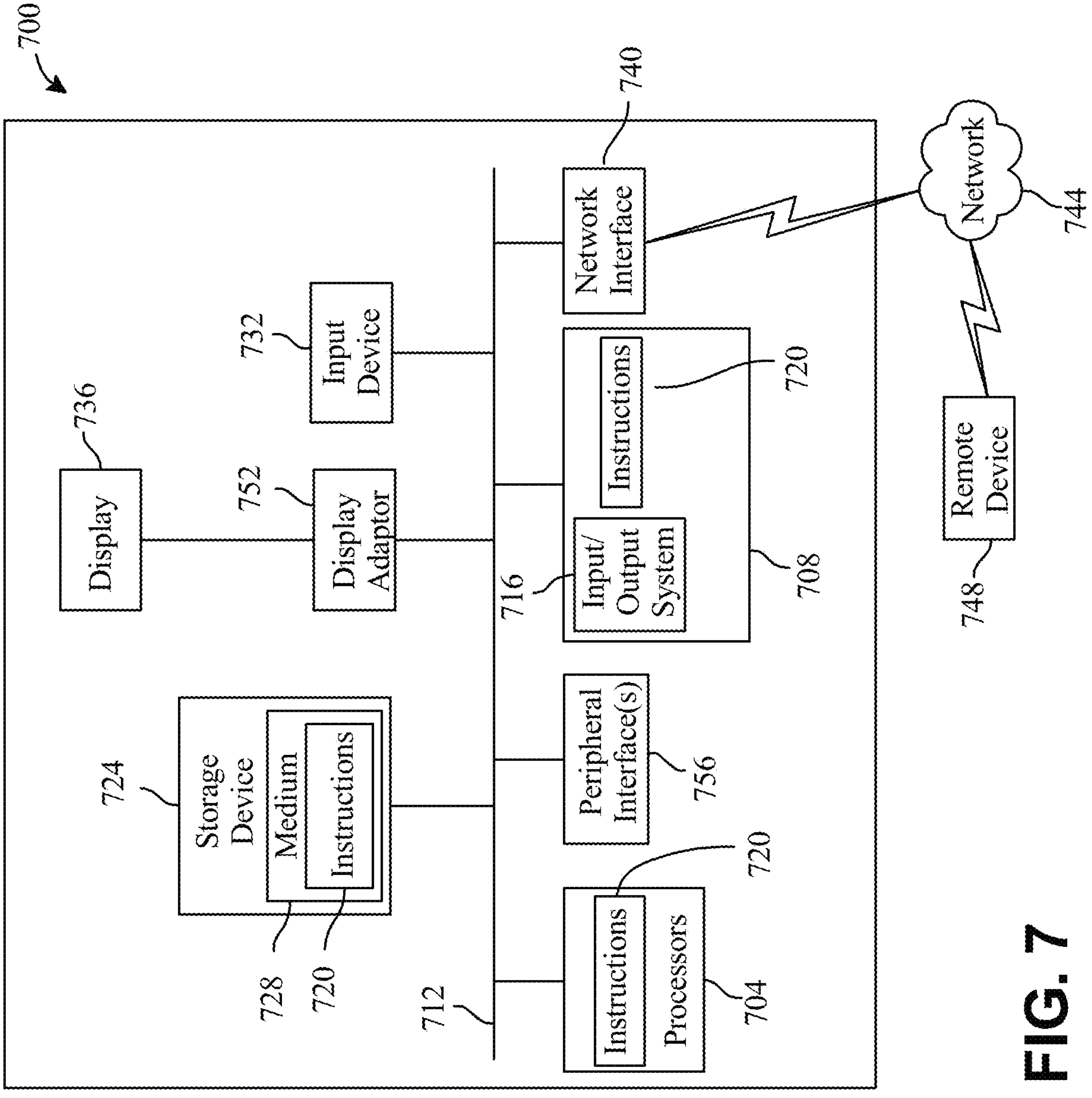
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724)

include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for multi-source data calibration and predictive model rendering, the system comprising:

at least a processor; and a memory communicatively connected to the at least a processor, wherein the memory contains instructions configuring the at least a processor to:

receive a plurality of heterogeneous data objects, wherein each of the plurality of heterogenous data objects is associated with an entity;

map the plurality of heterogenous data objects to a canonical data schema;

generate canonical feature data as a function of the canonical data schema, wherein generating the canonical feature data comprises:

identifying a derivation context for each of the plurality of heterogeneous data objects, wherein identifying the derivation context comprises:

querying a pipeline registry to retrieve metadata specifying a data source identifier, measurement conditions, preprocessing logic, and sampling frequency associated with each data object;

applying a context-classification model configured to assign probabilistic context labels to data objects for which explicit metadata is unavailable, wherein the derivation context is encoded as a context vector stored alongside each canonical feature; and normalizing a value magnitude across each of the plurality of heterogenous data objects as a function of the derivation context;

generate, using a predictive modeling engine, a projection value object as a function of the canonical feature data; and render, at a visualization interface, an output object comprising the canonical feature data and the projection value object.

2. The system of claim 1, wherein the at least a processor is further configured to store the canonical data schema in a centralized data warehouse.

3. The system of claim 1, wherein the at least a processor is further configured to:

detect, using an anomaly detection layer, an anomalous instance within a data object of the plurality of heterogenous data objects; and generate an anomaly indicator object as a function of detecting the anomalous instance.

4. The system of claim 3, wherein the at least a processor is further configured to:

generate an alert signal as a function of the anomaly indicator object; and transmit the alert signal to a monitoring interface of a source pipeline.

5. The system of claim 1, wherein normalizing the value magnitude across each of the plurality of data objects comprises:

applying a normalization model to the plurality of heterogenous data objects;

determining, using the normalization model, a scaling factor for each of the plurality of heterogeneous data objects as a function of transformation parameters associated with the derivation context of each of the plurality of heterogeneous data objects;

generating a standard scaling factor as a function of the scaling factor of each of the plurality of heterogeneous data objects; and scaling the value magnitude of each data object of the plurality of heterogeneous data objects as a function of the standard scaling factor.

6. The system of claim 1, wherein generating the projection value object comprises:

encoding the canonical feature data into a model-compatible representation;

generating a latent representation of the model-compatible representation, wherein generating the latent representation comprises applying, within the predictive modeling engine, one or more transformation layers;

calculating, as a function of the latent representation, a predicted value magnitude for at least one canonical feature of the canonical feature data; and assembling the predicted value magnitude into the projection value object.

7. The system of claim 1, wherein rendering the output object at the visualization interface comprises:

selecting, from the canonical feature data and the projection value object, a subset of data elements to display as a function of a rendering rule set; and formatting the subset of data elements into a layout configuration comprising a plurality of interface elements.

8. The system of claim 7, wherein the layout configuration defines one or more of:

a graphical arrangement;

a textual arrangement;

a numerical arrangement; and a spatial hierarchy, wherein the spatial hierarchy specifies relative positioning, grouping, and alignment of the plurality of interface elements within the visualization interface.

9. The system of claim 1, wherein the visualization interface comprises role-based access controls configured to present different subsets of the output object to different user classes.

10. The system of claim 1, wherein the at least a processor is further configured to execute an optimization engine, wherein the optimization engine is configured to update one or more threshold parameters of one or more models used by the system as a function of a feedback signal.

11. A method of multi-source data calibration and predictive model rendering, the method comprising:

receiving, by at least a processor, a plurality of heterogeneous data objects, wherein each of the plurality of heterogenous data objects is associated with an entity;

mapping, using the at least a processor, the plurality of heterogenous data objects to a canonical data schema;

generating, using the at least a processor, canonical feature data as a function of the canonical data schema, wherein generating the canonical feature data comprises:

identifying a derivation context for each of the plurality of heterogeneous data objects wherein identifying the derivation context comprises:

querying a pipeline registry to retrieve metadata specifying a data source identifier, measurement conditions, preprocessing logic, and sampling frequency associated with each data object;

applying a context-classification model configured to assign probabilistic context labels to data objects for which explicit metadata is unavailable, wherein the derivation context is encoded as a context vector stored alongside each canonical feature; and normalizing a value magnitude across each of the plurality of heterogenous data objects as a function of the derivation context;

generating, using a predictive modeling engine, a projection value object as a function of the canonical feature data; and rendering, at a visualization interface, an output object comprising the canonical feature data and the projection value object.

12. The method of claim 11, further comprising storing, using the at least a processor, the canonical data schema in a centralized data warehouse.

13. The method of claim 11, further comprising:

detecting, using an anomaly detection layer, an anomalous instance within a data object of the plurality of heterogenous data objects; and generating, using the at least a processor, an anomaly indicator object as a function of detecting the anomalous instance.

14. The method of claim 13, further comprising:

generating, using the at least a processor, an alert signal as a function of the anomaly indicator object; and transmitting, using the at least a processor, the alert signal to a monitoring interface of a source pipeline.

15. The method of claim 11, wherein normalizing the value magnitude across each of the plurality of data objects comprises:

applying a normalization model to the plurality of heterogenous data objects;

determining, using the normalization model, a scaling factor for each of the plurality of heterogeneous data objects as a function of transformation parameters associated with the derivation context of each of the plurality of heterogeneous data objects;

generating a standard scaling factor as a function of the scaling factor of each of the plurality of heterogeneous data objects; and scaling the value magnitude of each data object of the plurality of heterogeneous data objects as a function of the standard scaling factor.

16. The method of claim 11, wherein generating the projection value object comprises:

encoding the canonical feature data into a model-compatible representation;

generating a latent representation of the model-compatible representation, wherein generating the latent representation comprises applying, within the predictive modeling engine, one or more transformation layers;

calculating, as a function of the latent representation, a predicted value magnitude for at least one canonical feature of the canonical feature data; and assembling the predicted value magnitude into the projection value object.

17. The method of claim 11, wherein rendering the output object at the visualization interface comprises:

selecting, from the canonical feature data and the projection value object, a subset of data elements to display as a function of a rendering rule set; and formatting the subset of data elements into a layout configuration comprising a plurality of interface elements.

18. The method of claim 17, wherein the layout configuration defines one or more of:

a graphical arrangement;

a textual arrangement;

a numerical arrangement; and a spatial hierarchy, wherein the spatial hierarchy specifies relative positioning, grouping, and alignment of the plurality of interface elements within the visualization interface.

19. The method of claim 11, wherein the visualization interface comprises role-based access controls configured to present different subsets of the output object to different user classes.

20. The method of claim 11, further comprising executing, using the at least a processor, an optimization engine, wherein the optimization engine is configured to update one or more threshold parameters of one or more models used throughout the method as a function of a feedback signal.

* * * * *